US012666482B2

(12) United States Patent
Naik et al.

(10) Patent No.: US 12,666,482 B2
(45) Date of Patent: Jun. 23, 2026

(54) RECONFIGURING LINK CHARACTERISTICS WHILE MAINTAINING LINKS

(71) Applicant: QUALCOMM Incorporated, San Diego, CA (US)

(72) Inventors: Gaurang Naik, San Diego, CA (US); Abhishek Pramod Patil, San Diego, CA (US); Alfred Asterjadhi, San Diego, CA (US); George Cherian, San Diego, CA (US); Yanjun Sun, San Diego, CA (US); Sai Yiu Duncan Ho, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 18/052,895

(22) Filed: Nov. 4, 2022

(65) Prior Publication Data

US 2024/0155713 A1 May 9, 2024

(51) Int. Cl.
*H04W 72/00* (2023.01)
*H04W 76/15* (2018.01)
*H04W 76/25* (2018.01)

(52) U.S. Cl.
CPC ........... *H04W 76/15* (2018.02); *H04W 76/25* (2018.02)

(58) Field of Classification Search
CPC .................................................... H04W 76/15
See application file for complete search history.

(56) References Cited

U.S. PATENT DOCUMENTS

2022/0287121 A1* 9/2022 Hwang ................. H04W 76/15
2025/0080628 A1* 3/2025 Kim ......................... H04L 69/14

FOREIGN PATENT DOCUMENTS

WO WO-2022211417 A1 10/2022

OTHER PUBLICATIONS

International Search Report and Written Opinion—PCT/US2023/074034—ISA/EPO—Dec. 20, 2023.

* cited by examiner

*Primary Examiner* — Pamit Kaur
(74) *Attorney, Agent, or Firm* — Holland & Hart LLP

(57) ABSTRACT

This disclosure provides methods, components, devices, and systems for reconfiguring link characteristics while maintaining links. Some aspects more specifically relate to a first and second wireless communication device establishing a plurality of wireless communication links that are based on or associated with a set of characteristics such as capabilities of the first and second wireless communication devices and association parameters. The first wireless communication device may transmit, to the second wireless communication device, a request to update one of the characteristics while maintaining each wireless communication link of the plurality of wireless communication links. The second wireless communication device may transmit a response to the request that includes an indication about updating the characteristic. Then if the response includes an indication to update the characteristic, the first and second wireless communication devices may communicate according to the updated characteristic.

30 Claims, 9 Drawing Sheets

600

Establish, with a second wireless communication device and based on a set of multiple capabilities of the first wireless communication device and the second wireless communication device, a set of wireless communication links each of which is associated with a respective set of multiple parameters — 605

Transmit, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters — 610

Receive, from the second wireless communication device and based on transmitting the request, a response to the request including an indication about updating the characteristic — 615

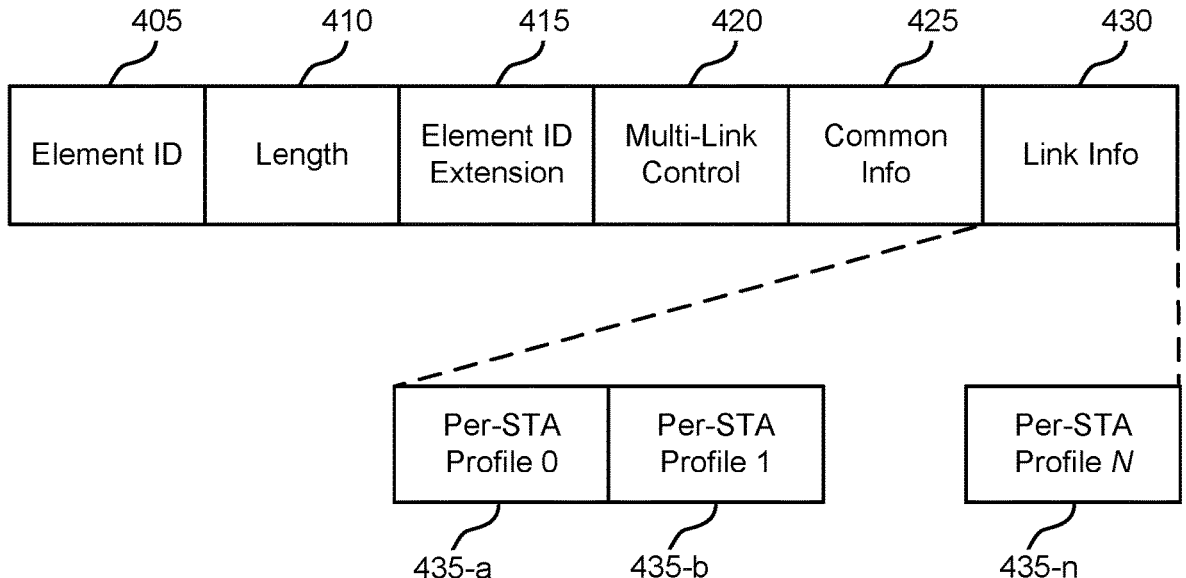
*Figure 4*

600

Establish, with a second wireless communication device and based on a set of multiple capabilities of the first wireless communication device and the second wireless communication device, a set of wireless communication links each of which is associated with a respective set of multiple parameters

605

Transmit, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters

610

Receive, from the second wireless communication device and based on transmitting the request, a response to the request including an indication about updating the characteristic

Figure 7:
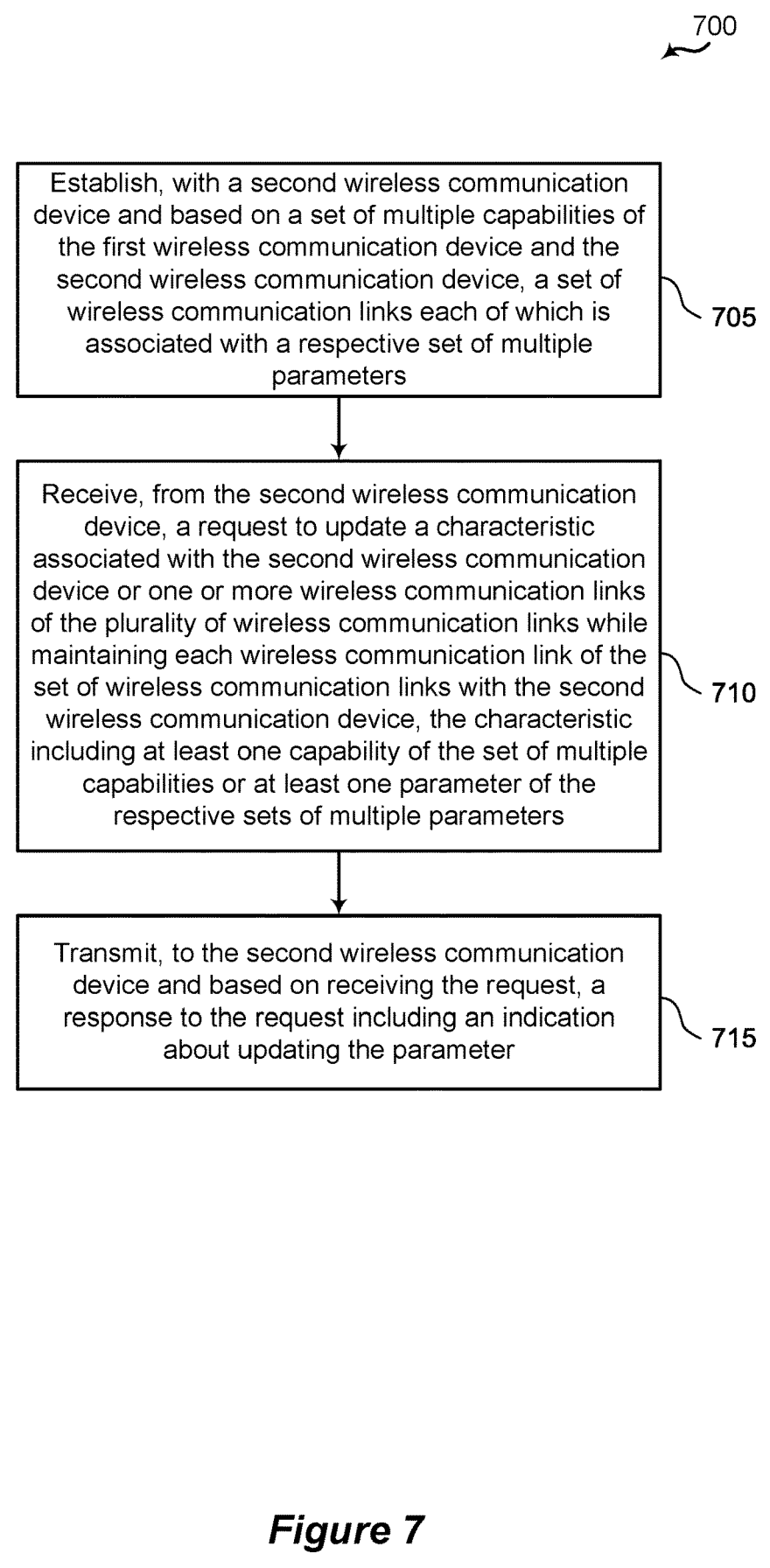

Establish, with a second wireless communication device and based on a set of multiple capabilities of the first wireless communication device and the second wireless communication device, a set of wireless communication links each of which is associated with a respective set of multiple parameters

705

Receive, from the second wireless communication device, a request to update a characteristic associated with the second wireless communication device or one or more wireless communication links of the plurality of wireless communication links while maintaining each wireless communication link of the set of wireless communication links with the second wireless communication device, the characteristic including at least one capability of the set of multiple capabilities or at least one parameter of the respective sets of multiple parameters

710

Transmit, to the second wireless communication device and based on receiving the request, a response to the request including an indication about updating the parameter

RECONFIGURING LINK CHARACTERISTICS WHILE MAINTAINING LINKS

TECHNICAL FIELD

The following relates to wireless communication, and more specifically, to reconfiguring link characteristics while maintaining links.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices (including both APs and STAs) are capable of multi-link operation (MLO), which supports the establishment and use of multiple different communication links between a STA and an AP. An MLO-capable device may be referred to as a multi-link device (MLD). For example, an AP MLD and a non-AP MLD may establish multiple communication links, and may communicate over one or more of the established communication links at a given time. In some instances, it becomes necessary or advantageous to update a characteristic associated with one or both of the MLDs or one or more of the wireless communication links. To update a characteristic associated with a wireless communication link, the non-AP MLD may be required to disassociate and then reassociate with the AP MLD with the updated characteristic. Consequently, the non-APMLD is unable to update the characteristic associated with the device or the wireless communication link while maintaining the other wireless communication links. The disassociation followed by the reassociation may naturally disrupt communications between the two MLDs, which may increase latency or reduce throughput, among other problems.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device includes a processor, memory coupled with the processor, and instructions stored in the memory. The instructions may be executable by the processor to cause the wireless communication device to establish, with a second wireless communication device and based on a set of multiple capabilities of the first wireless communication device and the second wireless communication device, a set of multiple wireless communication links each of which is associated with a respective set of multiple parameters, transmit, to the second wireless communication device, a request to update a characteristic associated with the first wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and receive, from the second wireless communication device and based on transmitting the request, a response to the request including an indication about updating the characteristic.

Another innovative aspect of the subject matter described in this disclosure can be implemented in a method for wireless communication. The method includes establishing, with a second wireless communication device and based on a set of multiple capabilities of the first wireless communication device and the second wireless communication device, a set of wireless communication links each of which is associated with a respective set of multiple parameters, transmitting, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters, and receiving, from the second wireless communication device and based on transmitting the request, a response to the request including an indication about updating the characteristic.

Another innovative aspect of the subject matter described in this disclosure can be implemented in another apparatus for wireless communication at a wireless communication device. The apparatus may include means for establishing, with a second wireless communication device and based on a set of multiple capabilities of the first wireless communication device and the second wireless communication device, a set of wireless communication links each of which is associated with a respective set of multiple parameters, means for transmitting, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters, and means for receiving, from the second wireless communication device and based on transmitting the request, a response to the request including an indication about updating the characteristic.

Another innovative aspect of the subject matter described in this disclosure can be implemented in a non-transitory computer-readable medium storing code for wireless communication at a wireless communication device. The code may include instructions executable by a processor to establish, with a second wireless communication device and based on a set of multiple capabilities of the first wireless communication device and the second wireless communication device, a set of multiple wireless communication links each of which is associated with a respective set of multiple parameters, transmit, to the second wireless communication device, a request to update a characteristic associated with the first wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and receive, from the second wireless communication device and based on transmitting the request, a response to the request including an indication about updating the characteristic.

In some examples of the method, apparatuses, and non-transitory computer-readable medium described herein, transmitting the request may include operations, features, means, or instructions for transmitting, to the second wireless communication device, a message including the request to update the characteristic and further including an indication that the request to update the characteristic may be associated with the set of multiple wireless communication links, where the request may be to update the characteristic while maintaining each wireless communication link of the set of multiple of wireless communication links based on the message including the indication that the request to update the characteristic may be associated with the set of multiple wireless communication links.

Another innovative aspect of the subject matter described in this disclosure can be implemented in a wireless communication device. The wireless communication device includes a processor, memory coupled with the processor, and instructions stored in the memory. The instructions may be executable by the processor to cause the apparatus to establish, with a second wireless communication device and based on a set of multiple capabilities of the first wireless communication device and the second wireless communication device, a set of multiple wireless communication links each of which is associated with a respective set of multiple parameters, receive, from the second wireless communication device, a request to update a characteristic associated with the second wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and transmit, to the second wireless communication device and based on receiving the request, a response to the request including an indication about updating the characteristic.

Another innovative aspect of the subject matter described in this disclosure can be implemented in a method for wireless communication. The method includes establishing, with a second wireless communication device and based on a set of multiple capabilities of the first wireless communication device and the second wireless communication device, a set of multiple wireless communication links each of which is associated with a respective set of multiple parameters, receiving, from the second wireless communication device, a request to update a characteristic associated with the second wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and transmitting, to the second wireless communication device and based on receiving the request, a response to the request including an indication about updating the characteristic.

Another innovative aspect of the subject matter described in this disclosure can be implemented in another apparatus for wireless communication at a wireless communication device. The apparatus may include means for establishing, with a second wireless communication device and based on a set of multiple capabilities of the first wireless communication device and the second wireless communication device, a set of multiple wireless communication links each of which is associated with a respective set of multiple parameters, means for receiving, from the second wireless communication device, a request to update a characteristic associated with the second wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and means for transmitting, to the second wireless communication device and based on receiving the request, a response to the request including an indication about updating the characteristic.

Another innovative aspect of the subject matter described in this disclosure can be implemented in a non-transitory computer-readable medium storing code for wireless communication at a wireless communication device. The code may include instructions executable by a processor to establish, with a second wireless communication device and based on a set of multiple capabilities of the first wireless communication device and the second wireless communication device, a set of multiple wireless communication links each of which is associated with a respective set of multiple parameters, receive, from the second wireless communication device, a request to update a characteristic associated with the second wireless communication device or one or more wireless communication links of the set of multiple wireless communication links while maintaining each wireless communication link of the set of multiple wireless communication links with the second wireless communication device, the characteristic including at least one capability of the set of multiple capabilities or at least one parameter of the respective sets of multiple parameters, and transmit, to the second wireless device and based on receiving the request, a response to the request including an indication about updating the characteristic.

In some examples of the method, apparatuses, and non-transitory computer-readable medium described herein, receiving the request may include operations, features, means, or instructions for receiving, from the second wireless communication device, a message including the request to update the characteristic, and further including an indication that the request to update the characteristic may be associated with the set of multiple wireless communication links, where the request may be to update the characteristic while maintaining each wireless communication link of the set of multiple of wireless communication links based on the message including the indication that the request to update the characteristic may be associated with the set of multiple wireless communication links.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4 shows an example of a multi-link element that supports reconfiguring link characteristics while maintaining links according to some aspects of the present disclosure.

FIGS. 6 and 7 show flowcharts illustrating example processes performable by wireless communication devices that support reconfiguring link characteristics while maintaining links according to some aspects of the present disclosure.

Like reference numbers and designations in the various drawings indicate like elements.

DETAILED DESCRIPTION

Figure 1:
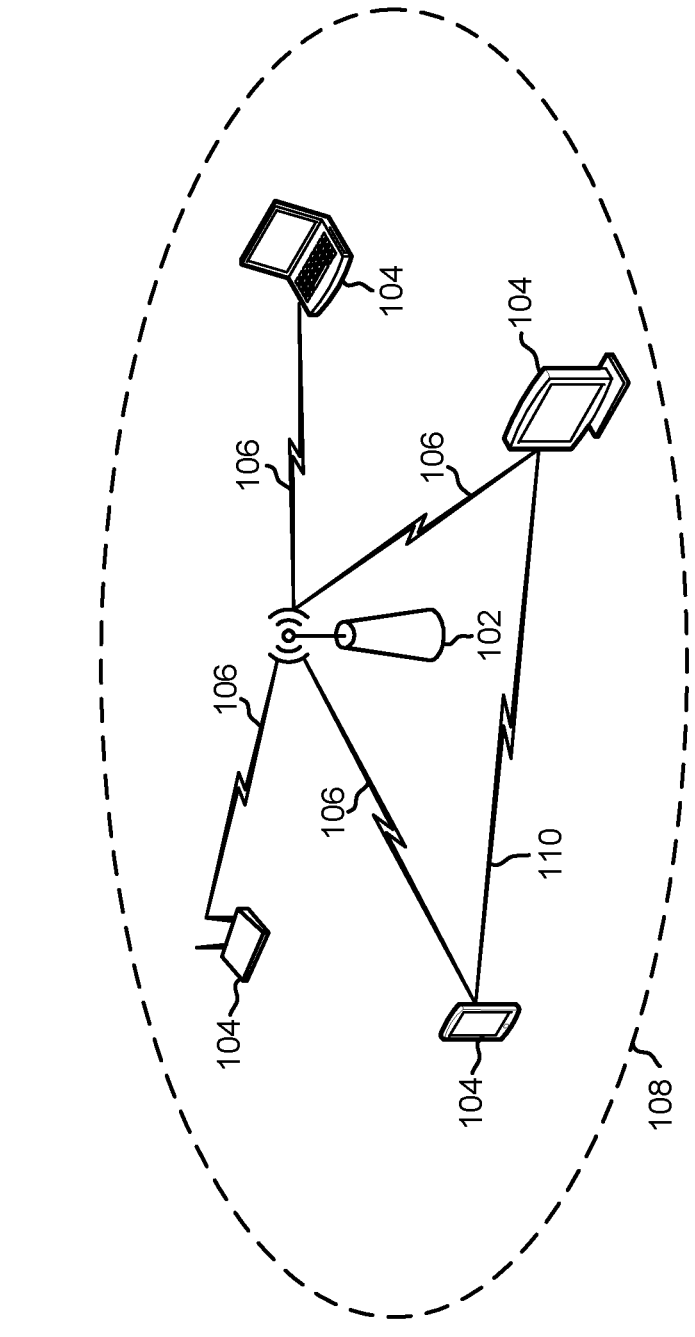
FIG. 1 shows a pictorial diagram of an example wireless communication network that supports reconfiguring link characteristics while maintaining links according to some aspects of the present disclosure.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3 rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to wireless communication link reconfiguration. Some aspects more specifically relate to reconfiguring a device or a first wireless communication link (hereinafter also referred to simply as a "link") while maintaining any additional existing links between two wireless communication devices, for example, such as between an access point (AP) multi-link device (MLD) and an associated non-AP MLD (also referred to as a wireless station (STA) MLD). In some examples, the AP MLD and the non-AP MLD may establish multiple different wireless communication links, which may be in the same or different bands (such as a first link on a 2.4 GHz band, a second link on a 5 GHz band, and a third link on a 6 GHz band). Each of the MLDs and each of the different wireless communication links may be associated with respective characteristics such as parameters associated with a MAC address of one or both of the MLDs, whether an existing link pair supports simultaneous transmit receive (STR) or non-simultaneous transmit receive (NSTR) operations, an anchor link utilized by the non-AP STA MLD 204, an enhanced distributed channel access (EDCA) parameter associated with one or both of the MLDs, a transmission power envelope (TPE) element for one of the MLDs or the communication links 206, medium synchronization delay (MSD) information associated with one of the MLDs or the communication links 206, or an association identifier (AID) associated with one or both of the MLDs. Additionally, each of the MLDs and each of the different wireless communication links may be associated with respective characteristics such as capabilities associated with whether one or both of the MLDs support a reception of control frames from the transmitted BSSID corresponding to multiple BSSID set, a medium access control (MAC) padding duration used by the MLDs, whether one or both of the MLDs support an enhanced multi-link single radio (EMLSR) mode or an enhanced multi-link multiple radio (EMLMR) mode, a listen interval implemented by each of the MLDs, or a traffic identifier (TID) to link mapping (T2LM) mode supported by the MLDs.

In some examples, to update a characteristic (for example, a parameter or a capability) associated with one of the wireless communication links or associated with one of the AP MLD or non-AP MLD while maintaining the other existing established wireless communication links, the non-AP MLD or the AP MLD may transmit, to the AP MLD or the non-AP MLD, a request to update the characteristic associated with itself or a particular wireless communication link while maintaining the remaining wireless communication links between the two MLDs. In some examples, in response to receiving the request, the AP MLD or the non-AP MLD may transmit a response to the AP MLD or the non-AP MLD that approves the request, denies the request, or proposes an alternative update to the characteristic. In examples in which the response includes an approval or confirmation of the request, the AP MLD and non-AP MLD may coordinate an update of the characteristic, and communicate according to the updated characteristic. In some other examples in which the response includes a proposal for an alternative update, the non-AP MLD or the AP MLD may transmit another request to update the characteristic to the alternative update included in the response. In some other examples in which the response includes a denial of the request, the non-AP MLD may, in some implementations or instances, transmit another request proposing an alternative update to the characteristic.

Particular aspects of the subject matter described in this disclosure can be implemented to realize one or more of the following potential advantages. By updating or reconfiguring a characteristic associated with one or more wireless communication links while preserving the association and security of the remaining wireless communication links, an AP MLD and a non-AP MLD may reduce disruptions to any active sessions between the two MLDs (for example, as compared to updating or reconfiguring a characteristic associated with a wireless communication link by disassociating then reassociating). Additionally, the decrease in disruptions to the active sessions between the two devices may decrease latency, increase throughput and/or otherwise improve performance.

FIG. 1 shows a block diagram of an example wireless communication network 100 that supports reconfiguring link characteristics while maintaining links according to some aspects of the present disclosure. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell, which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a MAC address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) and one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an AID to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, and multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block acknowledgement (ACK) feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained. Additionally, or alternatively, the receiving device may transmit a HARQ feedback message to the transmitting device (for example, an acknowledgement (ACK)) that indicates that the first HARQ transmission was properly decoded. In response to receiving the ACK feedback message, the transmitting device may not transmit additional HARQ transmissions to the receiving device.

In some examples, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP 102. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs 102 each configured to communicate on a respective communication link with a respective one of multiple STAs 104 of a non-AP MLD (also referred to as a "STA MLD"). The STA MLD may communicate with the AP MLD over one or more of the multiple communication links at a given time.

One type of MLO is multi-link aggregation (MLA). In MLA, traffic associated with a single STA 104 is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications and at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as each radio being associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users for each multiplexed transmission served by the multi-link AP MLD.

In some examples of the WLAN 100, the communication links 106 between MLDs may be based on characteristics including capabilities of the one or both of the MLDs, association parameters of one or both of the MLDs, or parameters associated with the communication links 106 themselves. Additionally, the characteristics (such as the capabilities or parameters) may change over a duration that the MLDs have established communication links 106.

For example, an MLD such as a non-AP MLD (for example, a STA MLD) may support either STR or NSTR operations over a pair of established communication links, which may change over time. Specifically, when an AP MLD performs a channel switch, a frequency separation (for example, between frequencies associated with each of the communication links 106 between the AP MLD and the non-AP MLD) may decrease. Additionally, or alternatively, an AP MLD may increase a BSS operation bandwidth, which may in turn cause an out-of-band emission to increase. In either example, the communication links 106 between the AP MLD and the non-AP MLD that previously supported STR operations may no longer support the STR operations, and instead be communication links 106 that support NSTR operations (for example in response to the channel switch or the increase of BSS operation bandwidth).

In some other examples, an MLD such as a non-AP STA affiliated with a non-AP MLD may not initially support to receive control frames from the transmitted BSSID corresponding to multiple BSSID set. For example, a non-AP STA that is associated with a nontransmitted BSSID in multiple BSSID set may not support the reception of control frames from the transmitted BSSID for a certain selection of a transmitted BSSID. In implementations that support changes to the transmitted BSSID within the multiple BSSID set, the non-AP STA affiliated with the non-AP MLD may be capable of supporting a receive control frame from a new transmitted BSSID within the multiple BSSID set.

In some other implementations, a non-AP MLD may initially implement a first MAC padding duration for an EMLSR or an EMLMR mode. In some implementations, the non-AP MLD may be capable of changing the MAC padding duration for EMLSR or EMLMR. For example, the non-AP MLD may change the MAC padding duration for EMLSR or EMLMR in instances that an operating class changes in response to an APs 102 extended channel switch. Additionally, or alternatively, the non-AP MLD may change the MAC padding duration for EMLSR or EMLMR in instances that a configuration of an auxiliary (AUX) radio used for EMLSR operation changes. For example, if a configuration of an AUX radio changes from a deep sleep mode to a light sleep mode, the non-AP MLD may change the MAC padding duration for the EMLSR operation.

In some additional implementations, a non-AP MLD may determine which non-AP MLD mode to support (for example, from an EMLSR mode or an EMLMR mode or other modes) based on the established communication links 106 between the non-AP MLD and an AP MLD. For example, the non-AP MLD may select an EMLSR mode based on having 2.4 GHz and 5 GHz links established with the AP MLD. Additionally, or alternatively, the non-AP MLD may select an EMLMR mode based on having 5 GHz and 6 GHz links established with the AP MLD. Here, the non-AP MLD may determine to update or change the mode (for example, between an EMLSR mode and an EMLMR mode) in examples that an established link between the AP MLD and the non-AP MLD change.

In additional examples, a non-AP MLD may update a listen interval. For example, in implementations when a new communication link 106 is added (such as between the non-AP MLD and the AP MLD), the non-AP MLD may be capable of monitoring the new communication link 106 more frequently than the other previously-established communication links 106 and may update the listen interval. In another example, if the non-AP MLD changes a power save configuration of the non-AP MLD, the non-AP MLD may be capable of monitoring an existing communication more frequently.

In additional implementations, a T2LM mode supported by the non-AP MLD may change based on a configuration of a communication link. For example, the non-AP MLD may support a first T2LM mode (for example a T2LM mode 1) if each of the communication links pair 106 between the non-AP MLD and the AP MLD support STR operations. Additionally, the non-AP MLD may no longer be capable of supporting the first T2LM mode if a new communication link 106 is established between the non-AP MLD and the AP MLD that requires NSTR operation with an established communication link. Additionally, the non-AP MLD may also be unable to support the first T2LM mode if an existing communication link 106 becomes NSTR due to the AP MLD switching channels.

In additional examples, a non-AP MLD may update a MAC address associated with the non-AP MLD. For example, the non-AP MLD may determine to update its MAC address in order to preserve a privacy of the non-AP MLD.

In additional implementations, the non-AP MLD may update an anchor link for communicating with the AP MLD. In some examples, the non-AP MLD may monitor one of the established communication links 106 for some messages from the AP MLD (such as beacons, probe responses, or other group addressed frames). In some implementations, the non-AP MLD may update the communication link 106 (for example the anchor link) that the non-AP MLD monitors for those messages.

In additional examples of non-AP MLD and AP MLD capabilities or parameters changing over a duration that multiple communication links 106 are established between the non-AP MLD and the AP MLD, an AP 102 may change an EDCA parameter set of an associated STA 104 (for example, for one of the established communication links 106 between the AP MLD and the non-AP MLD). In some implementations, the STA 104 may ignore parameters that are broadcast in beacons on the respective links.

In additional implementations, an AP 102 (such as one of multiple APs 102 affiliated with an AP MLD) may update the TPE element for an associated client (such as one of multiple STAs 104 affiliated with a non-AP MLD) that is operating at a small distance from the AP 102. For example, an AP 102 may trigger the updated TPE element if a nearby STA 104 is transmitting at a high power that saturates the AP's radio front end 102.

In additional examples, an AP MLD may update an MSD information for a subset of STAs 104 (for example, a subset of the STAs 104 affiliated with a non-AP MLD). In some implementations, the AP MLD may update the MSD information based on a location of the STAs 104 in the BSS.

In additional implementations, an AP MLD may dynamically change an AID of an associated STA 104 (such as a STA 104 that is affiliated with a non-AP MLD) by sending a protected Action frame to the STA 104. In some examples, other STAs 104 may be unable to decode the AID of the recipient STA 104 based on the Action frame being protected, which may provide privacy to the recipient STA 104.

In additional examples, an AP MLD may dynamically change other parameters for associated STAs 104 (such as STAs 104 affiliated with a non-AP MLD) by sending a protected Group Addressed Action frame. Specifically, an AID list element in the Group Addressed Action frame may identify the STAs 104 to which the Group Addressed Action frame applies. For example, if a bit corresponding to the AID list element that is associated with a STA 104 is set to a '1,' the STA 104 may determine that the Group Addressed Action frame indicates for that STA 104 to change another parameter. Additionally, protecting the Group Addressed Action frame may prevent unassociated STAs 104 from decoding the parameters for the recipient STAs 104, which may provide privacy to the recipient STAs 104.

In some cases, to update a characteristic associated with one of the communication links 106 (for example, in cases that the communication link 106 is one of more than one established communication link 106 between the two wireless communication devices) or to update a characteristic associated with one of the wireless communication devices, the wireless communication devices may disassociate and then reassociate with the updated characteristic. That is, the wireless communication devices may be unable to update a characteristic associated with one of the communication links 106 or with the wireless communication devices while maintaining the other communication links 106. Specifically, while the wireless communication devices may implement a multi-link reconfiguration procedure, the multi-link reconfiguration procedure may correspond to communication link 106 addition or deletion rather than updating a characteristic while maintaining the communication links 106. For example, an AP MLD may implement a multi-link reconfiguration procedure to delete an affiliated AP 102. In this example, the deleted AP 102 may be removed from the multi-link setup between the AP MLD and each of the associated non-AP MLDs (such as non-AP MLDs). In some implementations, deleting the affiliated AP 102 may correspond to a global link deletion.

Additionally, the multi-link reconfiguration procedure may not enable an AP MLD to add an AP. Specifically, the multi-link reconfiguration procedure may not enable a non- AP MLD to add the AP 102 to an existing multi-link setup. Here, to add an AP 102 to the multi-link setup, the non-AP MLD may perform a multi-link reassociation with the AP MLD. The multi-link reassociation may disrupt communications between MLDs, which may increase latency in the communications between the MLDs.

In the example of the WLAN 100, wireless communication devices (such as AP MLDs and non-AP MLDs) may perform a multi-link reconfiguration procedure to add or delete links to an existing multi-link setup. For example, a non-AP MLD may send a one-to-one request to the AP MLD for a seamless addition of a link to an existing multi-link setup (such as for an addition of the link without performing a multi-link reassociation with the AP MLD). Additionally, or alternatively, the non-AP MLD may send a one-to-one request to the AP MLD to remove a link from an existing multi-link setup without affecting the other established links.

Additionally, wireless communication devices (such as AP MLDs and non-AP MLDs) in the WLAN 100 may perform a multi-link reconfiguration procedure to update a characteristic associated with one of the communication links 106 or associated with one of the wireless communication devices while maintaining the other communication links 106. Specifically, the wireless communication devices may perform a multi-link reconfiguration procedure to seamlessly update capabilities of one of the wireless communication devices or the communication links or to renegotiate association parameters without changing a quantity of communication links 106 that are part of the multi-link setup. For example, after establishing multiple communication links 106 between a first and second wireless communication device, the first wireless communication device may transmit a request to update a characteristic associated with the device or one or more of the communication links 106 while maintaining the remaining communication links 106 between the two wireless communication devices. Specifically, the first wireless communication device may transmit the request via a first management frame (for example, a frame that is defined for requesting to update a characteristic while maintaining other communication links or a multi-link reconfiguration request frame).

In response to receiving the request, the second wireless communication device may transmit a response that approves the request, proposes an alternative update, or denies the update. Specifically, the second wireless communication device may transmit the response via a second management frame (for example, a frame that is defined for responding to a request to update a characteristic while maintaining other communication links or a multi-link reconfiguration response frame). If the response includes an approval or confirmation of the request, the two wireless communication devices may coordinate an update of the characteristic, and communicate according to the updated characteristic. Additionally, or alternatively, if the second wireless communication device proposes an alternative update or denies the update, the first wireless communication device may, in some implementations, transmit another request including the alternative update or including another proposed update to the characteristic. By exchanging requests to update the characteristic and responses to the requests, the two wireless communication devices may perform a multi-link reconfiguration procedure to adjust a characteristic associated with a first communication link 106 or associated with one of the wireless communication devices while maintaining (for example, while not disassociating and reassociating) other communication links 106.

Figure 2:
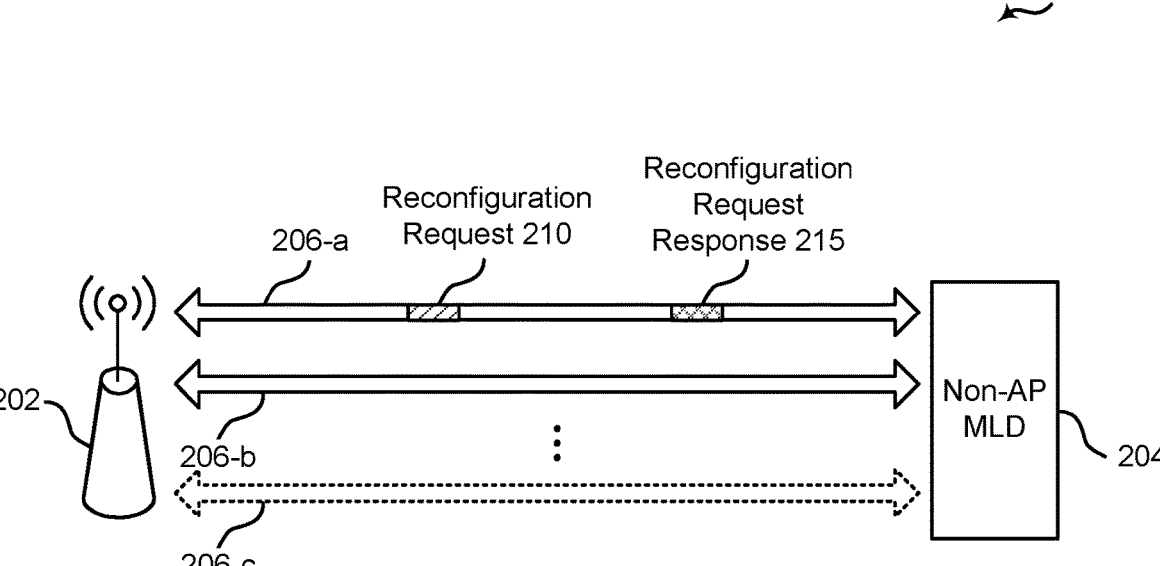
FIG. 2 shows another pictorial diagram of another example wireless communication networks that support reconfiguring link characteristics while maintaining links according to some aspects of the present disclosure.

FIG. 2 shows a pictorial diagram of another example wireless communication network 200 that supports reconfiguring link characteristics while maintaining links according to some aspects of the present disclosure. According to some aspects, the wireless communication network 200 (which will hereinafter be referred to as WLAN 200) may include aspects of the WLAN 100. For example, the AP MLD 202 and the non-AP MLD 204 may include aspects of APs 102 and STAs 104, respectively, as described with reference to FIG. 1. Specifically, the AP MLD 202 and the non-AP MLD 204 may be affiliated with multiple APs 102 and multiple STAs 104, respectively.

The AP MLD 202 may communicate with the non-AP MLD 204 over multiple communication links 206. The communications via the communication links 206 between the AP MLD 202 and the non-AP MLD 204 may be based on characteristics associated with the AP MLD 202, the non-AP MLD 204, and the communication links 206. In some implementations, the characteristics may include capabilities of the AP MLD 202 and the non-AP MLD 204, such as whether one or both of the MLDs support a reception of control frames from the transmitted BSSID corresponding to multiple BSSID set, a MAC padding duration used by the MLDs, whether one or both of the MLDs support an EMLSR or an EMLMR mode, a listen interval implemented by each of the MLDs, or a T2LM mode supported by the MLDs. The characteristics may additionally include parameters associated with one or both of the MLDs (from the AP MLD 202 and the non-AP MLD 204) or the communication links 206, such as a MAC address of one or both of the MLDs, whether an existing link pair supports STR or NSTR operations, an anchor link utilized by the non-AP MLD 204, an EDCA parameter associated with one or both of the MLDs, a TPE element for one of the MLDs or the communication links 206, MSD information associated with one of the MLDs or the communication links 206, or an AID associated with one or both of the MLDs.

In some implementations, after establishing one or more of the communication links 206, the AP MLD 202 and the non-AP MLD 204 may perform a multi-link reconfiguration procedure to update a characteristic (such as a capability or parameter associated with the AP MLD 202 or the non-AP MLD 204, an association parameter associated with the communication links 206). To initiate the multi-link reconfiguration procedure, a first MLD (for example the AP MLD 202 or the non-AP MLD 204) may transmit a reconfiguration request 210. The reconfiguration request 210 may include a request to update a characteristic associated with first MLD (such as a capability of the first MLD, an association parameter for one of the communication links 206 utilized by the first MLD) while maintaining each of the communication links 206. For example, the non-AP MLD 204 may transmit, to the AP MLD 202, the reconfiguration request 210. In another example, the AP MLD 202 may transmit, to the non-AP MLD 204, the reconfiguration request 210.

In some examples, the first MLD may transmit an unsolicited reconfiguration request 210 (for example, the first MLD may not transmit the reconfiguration request 210 in response to a change or trigger condition). In other examples, the first MLD may transmit the reconfiguration request 210 in response to a configuration update. For example, the non-AP MLD 204 may transmit the reconfiguration request 210 to change a non-AP MLD 204 capability in response to a configuration update associated with the communication links 206 made by the AP MLD 202. In another example, the non-AP MLD 204 may transmit the reconfiguration request 210 to update parameters associated with one of the communication links 206 (for example per-STA capabilities) as a response to configuration update made by the AP MLD 202 on that communication link 206.

Based on receiving the reconfiguration request 210, the receiving or second MLD (such as the AP MLD 202 or the non-AP MLD 204) may determine whether to update the characteristic indicated by the reconfiguration request 210. In examples that the reconfiguration request 210 indicates an updated capability of the MLD transmitting the reconfiguration request 210, the second MLD may determine to update the characteristic and transmit an approval or confirmation of the update via the reconfiguration request response 215. In examples that the reconfiguration request 210 requests an update a parameter (for example associated with the MLDs, associated with the communication links 206), the second MLD may approve the reconfiguration request 210, reject the reconfiguration request 210, or suggest an alternative update to the characteristic as compared to the proposed update to the characteristic included in the reconfiguration request 210. The second MLD may transmit, to the first MLD, an indication of the approval, rejection, or alternative update via the reconfiguration request response 215.

In examples that the second MLD transmits an approval or confirmation to update the characteristic within the reconfiguration request response 215, the AP MLD 202 and the non-AP ML 204 may coordinate an update of the characteristic, update the characteristic, and continue communicating via the communication links 206 according to the updated characteristic. In these examples, the AP MLD 202 and the non-AP MLD 204 may maintain the communication links 206 while updating the characteristic. then, the AP MLD 202 and the non-AP MLD 204 may communicate via the communication links 206 according to the updated characteristic.

In examples that the second MLD transmits an alternative update to the characteristic within the reconfiguration request response 215, the first MLD may determine whether to transmit an additional reconfiguration request 210 based on the alternative update to the characteristic within the reconfiguration request response 215. For example, if the first MLD transmits an initial reconfiguration request 210 including a request to update listen interval associated with one or multiple communication links 206 to 50 millisecond. In response, the second MLD may transmit a reconfiguration request response 215 indicating an alternative value for the listen interval of 25 milliseconds. Here, the first MLD may determine whether to transmit a second reconfiguration request 210 requesting for the listen interval to be updated to another value. For example, the first MLD may determine to transmit a second reconfiguration request 210 requesting for the listen interval to be updated to 30 milliseconds. In response, the second MLD may indicate an approval or confirmation of the update within a second reconfiguration request response 215. In this example, the MLDs may coordinate an updating of the listen interval to 30 milliseconds while maintaining the communication links 206.

In examples that the second MLD transmits a rejection of the reconfiguration request 210 via the reconfiguration request response 215, the MLDs may refrain from updating the characteristic. The first MLD may transmit additional requests to update the characteristic in response to the rejection. Additionally, or alternatively, the second MLD may not transmit additional reconfiguration requests 210 and the MLDs may communicate via the communication links 206 according to the original characteristics.

Figure 3:
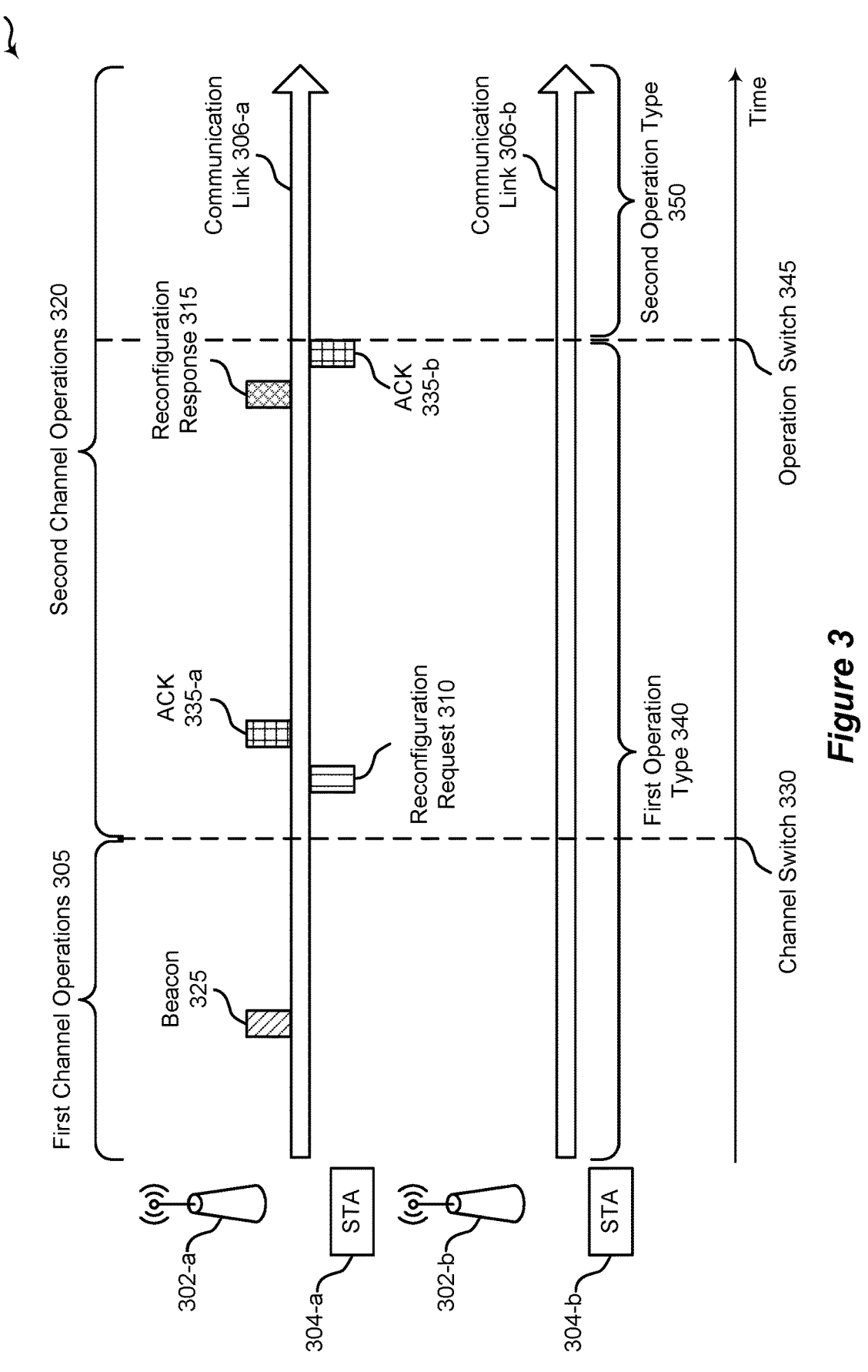
FIG. 3 shows an example of a communication timeline that supports reconfiguring link characteristics while maintaining links according to some aspects of the present disclosure.

FIG. 3 shows an example of a communication timeline 300 that supports reconfiguring link characteristics while maintaining links according to some aspects of the present disclosure. The communication timeline 300 may illustrate example communications between an AP MLD and a non-AP MLD via the communication links 306. Specifically, the AP MLD may include APs 302-a and 302-b and the non-AP MLD may include the STAs 304-a and 304-b, and the communication link 306-a may be between the AP 320-a and the STA 304-a and the communication link 306-b may be between the AP 302-b and the STA 304-b. According to some aspects, the communication timeline 300 may include aspects of the WLANs 100 and 200. For example, the APs 302-a and 302-b may be affiliated with an AP MLD, and the STAs 304-a and 304-b may be affiliated with a non-AP MLD, which may be examples of APs, AP MLDs, STAs, and non-AP MLDs, respectively, as described with reference to FIGS. 1 and 2.

At a time prior to the first channel operations 305, the AP MLD (including the APs 302-a and 302-b) and the non-AP MLD (including the STAs 304-a and 304-b) may establish the communication links 306-a and 306-b. During the first channel operations 305, the AP 302-a and the STA 304-a may be communicating over the communication link 306-a on a first channel. Additionally, the AP 302-a and the STA 304-a may communicate over the communication link 306-a according to the first operation type 340. For example, during the time period corresponding to the first operation type 340, the AP MLD and the non-AP MLD may communicate via the communication links 306 according to NSTR operations. That is, the communication links 306 may be NSTR links for the MLD STA (including the STAs 304-a and 304-b) during the first operation type 340.

During the first channel operations 305 when the communication link 306-a is on a first channel, the AP 302-a may transmit a beacon 325. The beacon 325 may indicate, to the STA 304-a, a channel switch 330 from the first channel to the second channel. In some implementations, the MLD AP may also indicate the channel switch 330 via the communication link 306-b. In accordance with the beacon 325, the AP 302-a and the STA 304-a may coordinate the channel switch 330 to switch from the first channel operations 305 to the second channel operations 320.

Based on the channel switch 330, a characteristic associated with the AP MLD, the non-AP MLD, or the communication links 306 may change. For example, the communication links 306 may become eligible to be STR communication links 306. Specifically, the channel switch 330 may increase a frequency separation between frequencies associated with the communication links 306-a and 306-b, which may enable the communication links 306 to be eligible for STR operations on one or more established link pairs after the channel switch 330.

Based on the determining that a characteristic associated with the AP MLD, the non-AP MLD, or the communication links 306 have changed (such as the communication links 306 being eligible for STR operations after the channel switch 330), the STA 304-a may transmit a reconfiguration request 310 to the AP 302-a via the communication link 306-a. For example, the STA 304-a may transmit the reconfiguration request 310 via a first management frame. The first management frame may correspond to a multi-link reconfiguration request frame. Additionally, or alternatively, the first management frame may correspond to a frame that is defined for requesting to update a characteristic while maintaining other communication links 306. The reconfiguration request 310 may include a request to update a characteristic associated with the AP MLD, the non-AP MLD, or the communication links 306 while maintaining the communication links 306. For example, the reconfiguration request may include a request to update the communication links 306 from NSTR communication links 306 to STR communication links while maintaining the communication links 306. While the communication timeline 300 illustrates the STA 304-*a* transmitting the reconfiguration request 310, the non-AP MLD 304 may transmit the request via another communication link 306.

Based on detecting the reconfiguration request 310 from the STA 304-*a*, the AP 302-*a* may transmit an ACK. The AP 302-*a* may then determine whether to approve or deny the request to update the communication links 306 to STR communication links. In the example of the communication timeline 300, the AP 302-*a* may determine to approve the request to update the communication links 306 to STR communication links 306. Specifically, because the request to update the communication links 306 to STR communication links 306 corresponds to a capability update, the AP 302-*a* may be unable to deny or renegotiate the request, and may accordingly determine to approve the request. The AP 302-*a* may transmit the reconfiguration response 315 to the STA 304-*a* indicating an approval or confirmation of the request to update the characteristic in accordance with reconfiguration request 310. For example, the AP 302-*a* may transmit the reconfiguration response 315 via a second management frame. The second management frame may correspond to a multi-link reconfiguration response frame. Additionally, or alternatively, the second management frame may correspond to a frame that is defined for responding to a request to update a characteristic while maintaining other communication links 306.

In response to detecting the reconfiguration response 315, the STA 304-*a* may transmit an ACK to the AP 302-*a*. If the reconfiguration response 315 indicates an approval or confirmation to update the characteristic indicated in the reconfiguration request 310, the AP MLD and the non-AP MLD may coordinate an operation switch 345 to update the characteristic while maintaining the communication links 306. In the example of the communication timeline 300, where the request to update the characteristic corresponds to a request to update a capability, the reconfiguration response 315 may indicate an approval or confirmation (for example, because a capability update may not be denied or negotiated). The AP MLD and the non-AP MLD may perform a coordinated operation switch 345 to begin the second operation type 350 (for example, to update the communication links 306 to STR communication links 306).

In some examples, the AP MLD and the non-AP MLD may update the characteristic immediately after the reconfiguration response 315 is received. For example, the responding MLD (in this case, the AP MLD) may transmit the reconfiguration response 315 after the responding MLD is ready to operate according to the updated characteristic. In this example, when the STA 304-*a* transmits the ACK 335-*b*, the MLDs may update the characteristic immediately. That is, the AP MLD and the non-AP MLD may update the characteristic (by performing the operation switch 345) immediately after the STA 304-*a* transmits the ACK 335-*b*.

In some additional examples, the AP MLD and the non-AP MLD may update the characteristic after a fixed timeout period after receiving the reconfiguration response 315. In some implementations, the responding MLD (in this case, the AP MLD) may transmit the reconfiguration response 315 after the responding MLD is ready to operate according to the updated characteristic. Then, both of the MLDs may wait the fixed timeout period after the STA 304-*a* receives the reconfiguration response 315 (or, in some implementations, after the STA 304-*a* transmits the ACK 335-*b*) to update the characteristic and operate according to the updated characteristic.

In some additional implementations, the AP MLD and the non-AP MLD may update the characteristic at a time that is based on the capability or the parameter being updated. For example, there may be some parameters or capabilities that the AP MLD and the non-AP MLD update immediately (for example, immediately after the reconfiguration request 310 is sent, or immediately after the ACK 335-*a* is received, or immediately after the reconfiguration response 315 is received, or immediately after the ACK 335-*b* is transmitted). Additionally, or alternatively, there may be other parameters or capabilities that the AP MLD and the non-AP MLD update after a timeout period. In some examples, the specific times for updating the various capabilities and parameters may be defined or standardized prior to the establishing of the communication links 306.

FIG. 4 shows an example of a multi-link element 400 that supports reconfiguring link characteristics while maintaining links according to some aspects of the present disclosure. According to some aspects, the WLANs 100 and 200 and the communication timeline 300 may implement aspects of the multi-link element 400. For example, an AP MLD or a non-AP MLD may transmit a reconfiguration request via a first management frame, as described with reference to FIGS. 1-3, the first management frame including a multi-link element 400. Additionally, or alternatively, an AP MLD or a non-AP MLD may transmit a reconfiguration response via a second management frame, as described with reference to FIGS. 1-3, the second management frame including a multi-link element 400.

The multi-link element 400 may be for multi-link reconfiguration. In some examples, the multi-link element 400 may be a basic multi-link element 400 or a reconfiguration multi-link element 400. Additionally, the multi-link element 400 may include various fields or elements. For example, the multi-link element 400 may include an element identifier (ID) field 405, a length field 410, an element ID extension field 415, a multi-link control field 420, a common information field 425, and a link information field 430. The link information field 430 may additionally include fields or elements associated with each of the STAs affiliated with the non-AP MLD. For example, if the non-AP MLD has N affiliated STAs, the link information field 430 may additionally include a first per-STA Profile 0 field 435-*a* (that includes information associated with a first STA); a second per-STA Profile 1 field 435-*b* (that includes information associated with a second STA); to an $n^{th}$ per-STA Profile N field 435-*n*.

The multi-link element 400 may also be utilized by MLDs (such as by non-AP MLDs or AP MLDs) to transmit multi-link reconfiguration requests. For example, an MLD may transmit a multi-link reconfiguration request via a management frame Action field. The management frame may correspond to a multi-link reconfiguration request frame. Additionally, or alternatively, the management frame may correspond to a frame that is defined for requesting to update a characteristic (for example, a characteristic associated with communication links or associated with an MLD) while maintaining communication links. Table 1, shown below, illustrates an example format of a first management frame Action field. The first management frame Action field may correspond to a multi-link reconfiguration request frame Action field format. Additionally, or alternatively, the first management frame Action field may correspond to a frame Action field associated with a frame that is defined for requesting to update the characteristic while maintaining communication links.

TABLE 1

| First Management Frame Action Field Format | |
|---|---|
| Order | Information |
| 1 | Category |
| 2 | Protected EHT Action |
| 3 | Dialog Token |
| 4 | Multi-link element 400 |

In the example of the first management frame action field described by Table 1, the multi-link reconfiguration request may be transmitted within a first management frame that includes category information (such as multi-link reconfiguration request category), a protected extremely high-throughput (EHT) action, a dialog token, followed by the multi-link element 400. In some examples, the first management frame may include a flag or a field in the first management frame indicating that the multi-link reconfiguration procedure applies to an existing link set (for example, that the multi-link reconfiguration procedure is for updating a characteristic while maintaining the communication links between the AP MLD and the non-AP MLD). In some examples, the flag or the field may be included in the category information of the first management frame. Additionally, or alternatively, the flag or the field may be included in the multi-link element 400 (such as within the multi-link control field 420, the common information field 425, or the link information field 430).

The first management frame may additionally include the updated capabilities or parameters. For example, the MLD transmitting the first management frame may include the updated capabilities or parameters within the common information field 425 when the updated capabilities or parameters are associated with the MLD. Additionally, or alternatively, the MLD transmitting the first management frame may include the updated capabilities or parameters within a relevant per-STA profile field 435. For example, if the capabilities or parameters are associated the STA 1, the transmitting MLD may include the updated capability or parameters within the corresponding per-STA Profile 1 field 435-b.

In some examples, the transmitting MLD may transmit the first management frame including the entire multi-link element 400 (for example, including each of the fields or elements within the multi-link element 400). In these examples, one or more fields or elements of the multi-link element 400 may include an indication of an updated capability or parameter (for example, the common information field 425 or one of the per-STA profile fields 435) and the remaining fields or elements of the multi-link element 400 may include indications of previously-indicated capabilities and parameters (for example, capabilities and parameters that are not requested to be updated by the first management frame). Here, an MLD that receives the first management frame may identify the changes indicated via the multi-link element (for example, based on comparing each of the indicated characteristics to identify any characteristics with values that are different than previously agreed-upon values).

In some additional examples, the transmitting MLD may transmit the first management frame that includes a portion of the fields of the multi-link element 400. Specifically, the MLD may only include the fields of the multi-link element 400 that indicate updated characteristics (such as the common information field 425 and a per-STA profile field 435). For example, if an MLD is transmitting a first management frame to update a MAC padding duration, the MLD may include the EMLSR padding delay subfield (for example containing the updated MAC padding duration) in the EML capabilities subfield of the common information field 425, as the EML capability is an MLD-level capability (and requests to update MLD-level capabilities may be included in the common information field 425). Additionally, the MLD may not include any of the other fields or subfields in the multi-link element 400 within the first management frame. In some implementations, transmitting only a portion of the fields in the multi-link element 400 may reduce signaling overhead when compared to transmitting all of the fields in the multi-link element 400.

Table 2, shown below, illustrates an example format of a second management frame Action field. The second management frame Action field may correspond to a multi-link reconfiguration response frame Action field format. Additionally, or alternatively, the second management frame Action field may correspond to a frame Action field associated with a frame that is defined for responding to a request to update the characteristic while maintaining communication links.

TABLE 2

| Second Management Frame Action Field Format | |
|---|---|
| Order | Information |
| 1 | Category |
| 2 | Protected EHT Action |
| 3 | Dialog Token |
| 4 | Reconfiguration Status List |
| 5 (Optional) | Multi-link element 400 |

In the example of the second management frame action field described by Table 2, the multi-link reconfiguration response may be transmitted within a second management frame (such as a multi-link reconfiguration response frame or a frame that is defined for responding to a request to update a characteristic while maintaining other communication links) that includes category information (such as multi-link reconfiguration request category), a protected extremely high-throughput (EHT) action, a dialog token, a reconfiguration status list, followed optionally by the multi-link element 400.

The reconfiguration status list may include a status code field that provides the status of the requested capability update or association parameters. For example, if the request is to update a capability, the status code field may indicate that the request is accepted (that is, capability changes may not be denied). Additionally, if the request is to update a parameter, the status code field may confirm, deny, or suggest an alternate value for the requested association parameters. That is, a responding MLD may accept, deny, or negotiate updated association parameters. If the status code indicates a negotiation of the updated parameter, the second management frame may include a field or subfield of the multi-link element 400 that are relevant to the parameter being negotiated. Additionally, if the status code field of the second management frame indicates that the updated parameter or capability is accepted or denied, the second management frame may not include the multi-link element 400. In additional examples, the second management frame may include a copy of the multi-link element 400 (for example, the same fields and contents of fields of the multi-link element 400) that is included in the corresponding first management frame.

In some other examples of transmitting or receiving a multi-link element 400, during a global link deletion each per-STA profile field 435 may include information of a link that is being deleted. In some implementations, a global link deletion may be advertised by including the multi-link element 400 for multi-link reconfiguration in a beacon or probe. Additionally, or alternatively, for a one-to-one link addition or deletion, each per-STA profile field 435 may include information of a link that is being added or deleted. For example, a one-to-one link addition or deletion may be performed by including the multi-link element 400 for multi-link reconfiguration in an Action frame. Additionally, or alternatively, links may be added or deleted within a same frame (such as a same Action frame).

Figure 5:
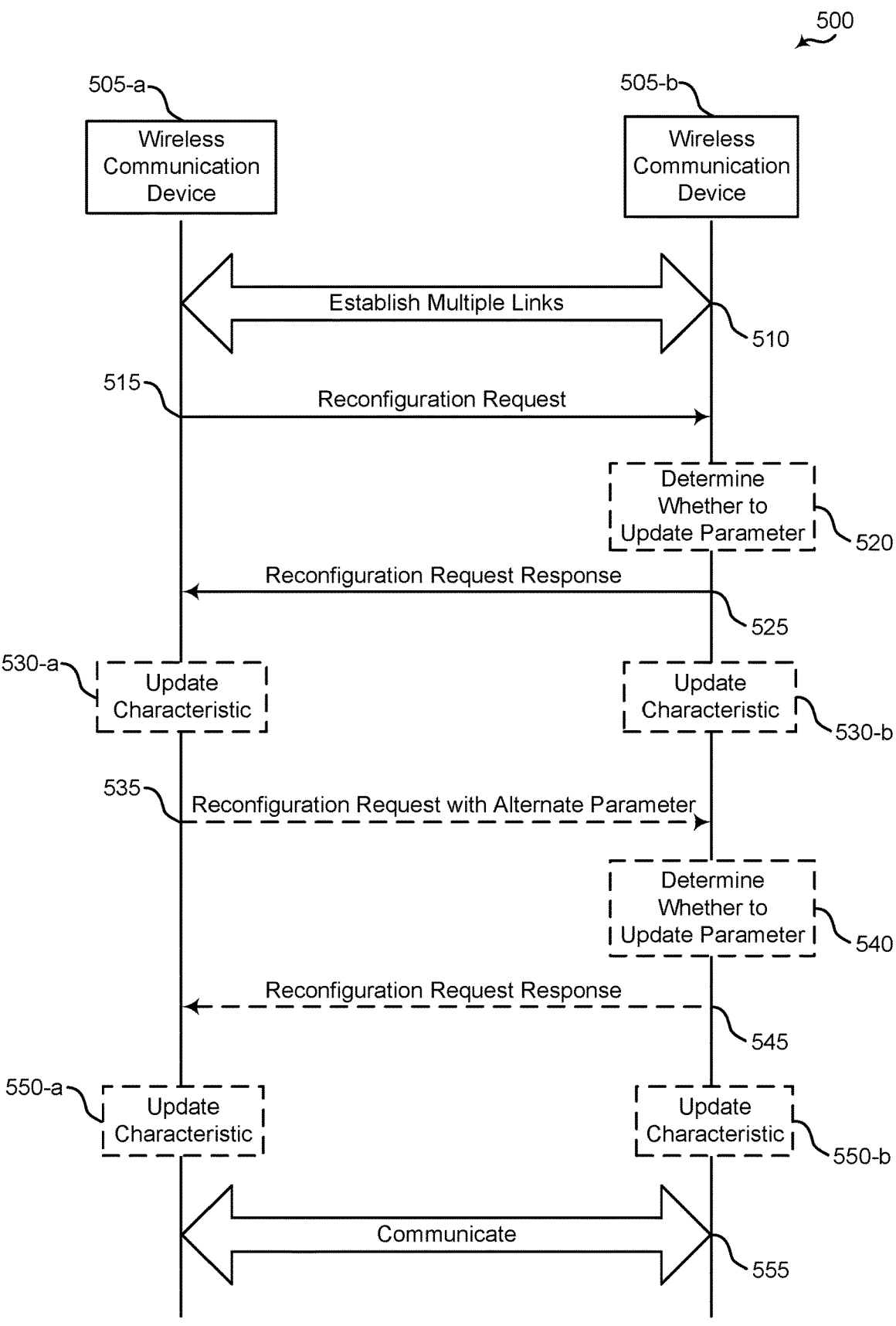
FIG. 5 shows an example of a process flow that supports reconfiguring link characteristics while maintaining links according to some aspects of the present disclosure.

FIG. 5 illustrates an example of a process flow 500 that supports reconfiguring link characteristics while maintaining links according to some aspects of the present disclosure. The process flow 500 may implement or be implemented to realize aspects of the WLANs 100 and 200, the communication timeline 300, and the multi-link element 400. In some examples, the process flow 500 illustrates communication between the wireless communication devices 505, which may be examples of an AP MLD and a non-AP MLD as illustrated by and described with reference to FIGS. 1-4. For example, the process flow 500 may be performed by a wireless communication device, such as the wireless communication devices 800 and 900 as described with reference to FIGS. 8 and 9.

In the following description of the process flow 500, the operations may be performed (such as reported or provided) in a different order than the order shown, or the operations performed by the example devices may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 510, the two wireless communication devices 505 may establish multiple communication links. That is, the wireless communication devices 505 may each be MLDs, and may establish more than one communication links. In some examples, the communication links may be based on a set of capabilities of the wireless communication devices 505 and associated with a respective set of parameters.

At 515, the wireless communication device 505-*a* may transmit a reconfiguration request to the wireless communication device 505-*b*. For example, the wireless communication device 505-*a* may transmit a request to update a characteristic associated with the wireless communication device 505-*a* while maintaining each wireless communication link of the set of multiple wireless communication links with the wireless communication device 505-*b*. In some examples, the characteristic may include at least one capability of the set of capabilities (such as the capabilities associated with one or both of the wireless communication devices 505) or at least one parameter of the respective sets of parameters (such as the parameters associated with one or both of the wireless communication devices 505 or the communication links).

At 520, the wireless communication device 505-*b* may optionally determine whether to update the parameter. For example, if the reconfiguration request includes a request to update a capability of the wireless communication device 505-*a*, the wireless communication device 505-*b* may not determine whether to update the parameter (as the wireless communication device 505-*b* may only accept requests to update a capability).

At 525, the wireless communication device 505-*b* may transmit a reconfiguration request response to the wireless communication device 505-*a*. For example, the wireless communication device 505-*b* may transmit a response to the request that includes an indication about updating the characteristic. The response to the request may include an indication of whether the request to update the characteristic is accepted, denied, or negotiated (for example, the reconfiguration response request includes an alternative updated characteristic). If the reconfiguration request response includes an acceptance of the reconfiguration request, the wireless communication devices 505 may proceed to 530. Additionally, if the reconfiguration request response includes a denial or an alternative updated characteristic, the wireless communication devices 505 may optionally proceed to 535.

At 530, the wireless communication devices 505 may optionally coordinate an update of the characteristic. For example, if the reconfiguration request response includes an approval or confirmation of the request to update the characteristic, at 530-*a* the wireless communication device 505-*a* may update the characteristic and at 530-*b* the wireless communication device 505-*b* may update the characteristic. In some implementations, 530-*a* and 530-*b* may occur at a same time. If the wireless communication devices 505 update the characteristic at 530, the wireless communication devices 505 may proceed to 555.

At 535, the wireless communication device 505-*a* may initiate a renegotiation procedure with the wireless communication device 505-*b*. For example, the wireless communication device 505-*a* may optionally transmit a second reconfiguration request with an alternative value of the parameter requested to be updated. At 540, the wireless communication device 505-*b* may determine whether to update the parameter to the alternate parameter included in the request. At 545, the wireless communication device 505-*b* may transmit a reconfiguration request response to the wireless communication device 505-*a*. In an examples of the reconfiguration request response transmitted at 545 including an approval or confirmation of the alternate parameter, the wireless communication devices may proceed to 550.

At 550, the wireless communication devices 505 may coordinate an update of the characteristic. For example, if the reconfiguration request response includes an approval or confirmation of the request to update the characteristic to the alternate value, at 550-*a* the wireless communication device 505-*a* may update the characteristic and at 550-*b* the wireless communication device 505-*b* may update the characteristic. In some implementations, 550-*a* and 550-*b* may occur at a same time. If the wireless communication devices 505 update the characteristic at 550, the wireless communication devices 505 may proceed to 555.

At 555, the wireless communication devices 505 may communicate according to the updated characteristic based on receiving the response that includes an approval or confirmation of the updated characteristic and updating the characteristic.

FIG. 6 shows a flowchart illustrating an example process 600 performable at a wireless communication device that supports reconfiguring link characteristics while maintaining links according to some aspects of the present disclosure.

The operations of the process 600 may be implemented by a wireless AP, a wireless STA, or their components as described herein. For example, the process 600 may be performed by a wireless communication device, such as the wireless communication device 800 described with reference to FIG. 8, operating as or within a wireless AP or a wireless STA. In some examples, the process 600 may be performed by a wireless AP or a wireless STA, such as one of the APs 102 or the STAs 104, respectively, described with reference to FIG. 1.

In some examples, in block 605, the wireless communication device may establish, with a second wireless communication device and based on a set of multiple capabilities of the first wireless communication device and the second wireless communication device, a set of wireless communication links each of which is associated with a respective set of multiple parameters.

In some examples, in block 610, the wireless communication device may transmit, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters.

In some examples, in block 615, the wireless communication device may receive, from the second wireless communication device and based on transmitting the request, a response to the request including an indication about updating the characteristic.

FIG. 7 shows a flowchart illustrating an example process 700 performable at a wireless communication device that supports reconfiguring link characteristics while maintaining links according to some aspects of the present disclosure. The operations of the process 700 may be implemented by a wireless AP, a wireless STA, or their components as described herein. For example, the process 700 may be performed by a wireless communication device, such as the wireless communication device 900 described with reference to FIG. 9, operating as or within a wireless AP or a wireless STA. In some examples, the process 700 may be performed by a wireless AP or a wireless STA, such as one of the APs 102 or the STAs 104, respectively, described with reference to FIG. 1.

In some examples, in block 705, the wireless communication device may establish, with a second wireless communication device and based on a set of multiple capabilities of the first wireless communication device and the second wireless communication device, a set of wireless communication links each of which is associated with a respective set of multiple parameters.

In some examples, in block 710, the wireless communication device may receive, from the second wireless communication device, a request to update a characteristic associated with the second wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of parameters.

In some examples, in block 715, the wireless communication device may transmit, to the second wireless communication device and based on receiving the request, a response to the request including an indication about updating the characteristic.

Figure 8:
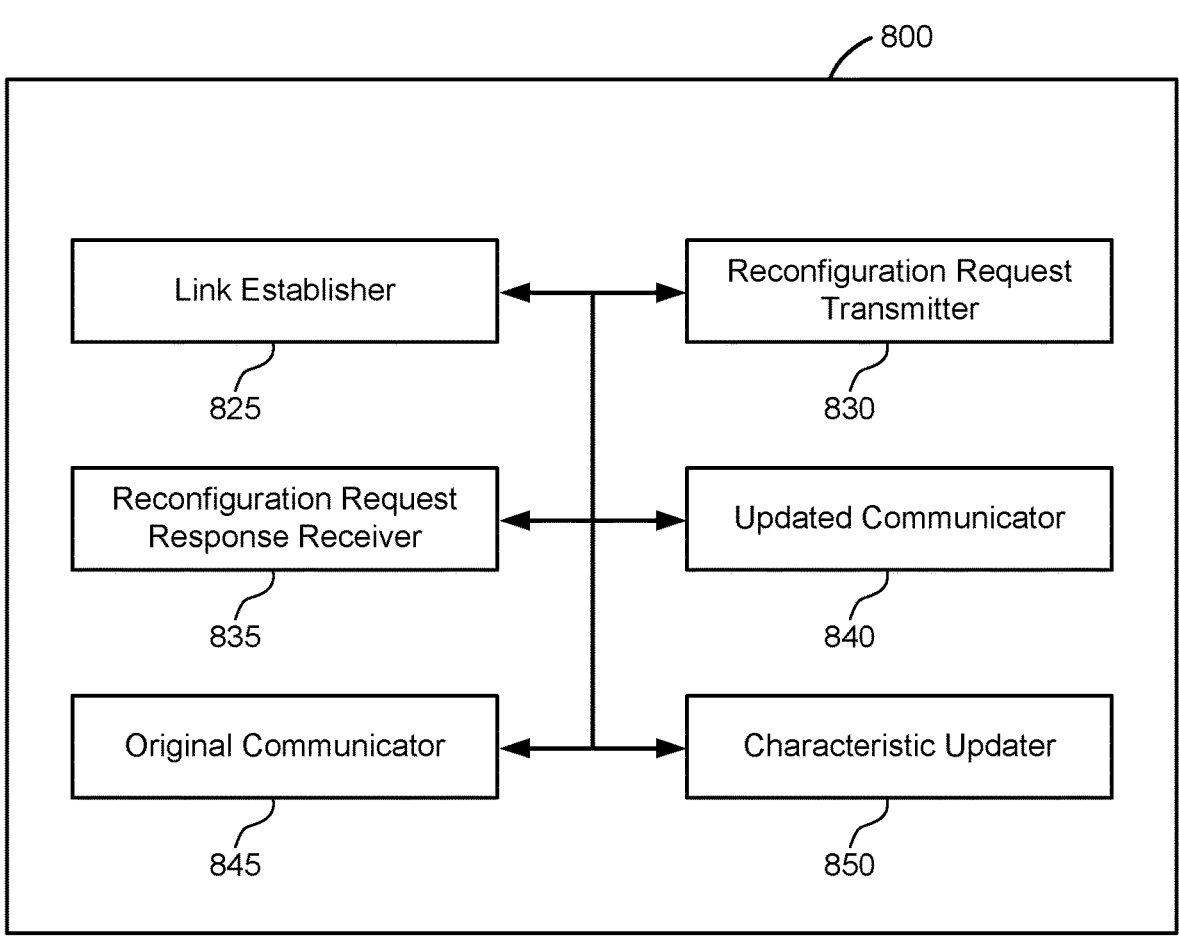
FIGS. 8 and 9 show block diagrams of example wireless communication devices that support reconfiguring link characteristics while maintaining links according to some aspects of the present disclosure.

FIG. 8 illustrates a block diagram of an example wireless communication device 800 that supports reconfiguring link characteristics while maintaining links according to some aspects of the present disclosure. In some implementations, the wireless communication device 800 is configured or operable to perform the process 600 described with reference to FIG. 6. In various examples, the wireless communication device 800 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some implementations, the wireless communication device 800 can be a device for use in an MLD, such as a non-AP MLD or an AP MLD as described with reference to FIG. 1. In some other examples, the wireless communication device 800 can be an MLD STA or MLD AP that includes such a chip, SoC, chipset, package or device as well as multiple antennas. The wireless communication device 800 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 800 also includes or can be coupled with an application processor which may be further coupled with another memory. In some implementations, the wireless communication device 800 further includes a user interface (UI) (such as a touchscreen or keypad) and a display, which may be integrated with the UI to form a touchscreen display. In some implementations, the wireless communication device 800 may further include one or more sensors such as, for example, one or more inertial sensors, accelerometers, temperature sensors, pressure sensors, or altitude sensors.

The wireless communication device 800 includes a link establisher 825, a reconfiguration request transmitter 830, a reconfiguration request response receiver 835, an updated communicator 840, an original communicator 845, and a characteristic updater 850. Portions of one or more of the components 825, 830, 835, 840, 845, and 850 may be implemented at least in part in hardware or firmware. For example, the link establisher 825 may be implemented at least in part by a modem. In some implementations, at least some of the components 825, 830, 835, 840, 845, or 850 are implemented at least in part by a processor and as software stored in a memory. For example, portions of one or more of the components 825, 830, 835, 840, 845, or 850 can be implemented as non-transitory instructions (or "code") executable by the processor to perform the functions or operations of the respective module. In some cases, the wireless communication device 800 may be referred to as a first wireless communication device.

In some implementations, the processor may be a component of a processing system. A processing system may generally refer to a system or series of machines or components that receives inputs and processes the inputs to produce a set of outputs (which may be passed to other systems or components of, for example, the device 800). For example, a processing system of the device 800 may refer to a system including the various other components or sub-components of the device 800, such as the processor, or a transceiver, or a communications manager, or other components or combinations of components of the device 800. The processing system of the device 800 may interface with other components of the device 800, and may process information received from other components (such as inputs or signals) or output information to other components. For example, a chip or modem of the device 800 may include a processing system, a first interface to output information and a second interface to obtain information. In some implementations, the first interface may refer to an interface between the processing system of the chip or modem and a transmitter, such that the device 800 may transmit information output from the chip or modem. In some implementations, the second interface may refer to an interface between the processing system of the chip or modem and a receiver, such that the device 800 may obtain information or signal inputs, and the information may be passed to the processing system. A person having ordinary skill in the art will readily recognize that the first interface also may obtain information or signal inputs, and the second interface also may output information or signal outputs.

The link establisher 825 may be capable of, configured to, or operable to establish with a second wireless communication device and based on a set of multiple capabilities of the first wireless communication device and the second wireless communication device, a set of wireless communication links each of which is associated with a respective set of multiple parameters. The reconfiguration request transmitter 830 may be capable of, configured to, or operable to transmit, to the second wireless communication device, a request to update a characteristic associated with the first wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters. The reconfiguration request response receiver 835 may be capable of, configured to, or operable to receive, from the second wireless communication device and based on transmitting the request, a response to the request including an indication about updating the characteristic.

In some implementations, to support transmitting the request, the reconfiguration request transmitter 830 may be capable of, configured to, or operable to transmit, to the second wireless communication device, a message including the request to update the characteristic and further including an indication that the request to update the characteristic is associated with the set of wireless communication links, where the request may be to update the characteristic while maintaining each wireless communication link of the set of multiple of wireless communication links based on the message including the indication that the request to update the characteristic is associated with the set of wireless communication links.

In some examples, to support transmitting the request, the reconfiguration request transmitter 830 may be capable of, configured to, or operable to transmit, to the second wireless communication device, a message including a first field corresponding to the characteristic and indicating the request to update the characteristic, the message not including one or more second fields each of which corresponds to a respective one of the set of multiple capabilities or a respective one of the respective sets of multiple parameters that is different than the characteristic requested to be updated.

In some examples, the request is transmitted via a first multi-link element within a first management frame. In some examples, the response is received via a second multi-link element within a second management frame.

In some examples, the first management frame is a multi-link reconfiguration request frame. In some examples, the second management is a multi-link reconfiguration response frame.

In some examples, the request is transmitted within one or more link information fields of the first multi-link element based on the characteristic being associated with the first wireless communication device. In some examples, the request is transmitted within a common information field of the first multi-link element based on the characteristic being associated with the second wireless communication device.

In some examples, to support transmitting the request, the reconfiguration request transmitter 830 may be capable of, configured to, or operable to transmit, to the second wireless communication device, a message including a first field corresponding to the characteristic and indicating the request to update the characteristic, the message further including one or more second fields each of which corresponds to a respective one of the set of multiple capabilities or a respective one of the respective sets of multiple parameters that is different than the characteristic requested to be updated.

In some examples, the request includes an indication of an updated characteristic. In some examples, the response includes a confirmation that the characteristic is updated to the updated characteristic.

In some examples, the characteristic includes one of the set of multiple capabilities of the first wireless communication device or the second wireless communication device. In some examples, the response includes the confirmation based on the characteristic including one of the set of multiple capabilities of the first wireless communication device or the second wireless communication device.

In some implementations, the request includes an indication of a first proposed update to the characteristic. In some implementations, the response includes an indication of a second proposed update to the characteristic that is different than the first proposed update to the characteristic.

In some examples, the original communicator 845 may be capable of, configured to, or operable to communicate with the second wireless communication device according to the respective sets of multiple parameters without updating the characteristic based on the response indicating a denial of the request to update the characteristic.

In some examples, the characteristic updater 850 may be capable of, configured to, or operable to update the characteristic upon receiving the response based on the response indicating a confirmation of the request to update the characteristic. In some examples, the updated communicator 840 may be capable of, configured to, or operable to communicate with the second wireless communication device according to the updated characteristic based on receiving the response, where communicating with the second wireless communication device according to the updated characteristic begins after receiving the response.

In some examples, the characteristic updater 850 may be capable of, configured to, or operable to update the characteristic a duration after receiving the response based on the response indicating a confirmation of the request to update the characteristic. In some examples, the updated communicator 840 may be capable of, configured to, or operable to communicate with the second wireless communication device according to the updated characteristic based on receiving the response, where communicating with the second wireless communication device according to the updated characteristic begins according to the defined duration after receiving the response.

In some examples, the characteristic updater 850 may be capable of, configured to, or operable to determine the duration between receiving the response and updating the characteristic based on the characteristic requested to be updated.

In some examples, the first wireless communication device and the second wireless communication device each include one of a wireless STA and wireless AP. For example, the first wireless communication device may include a wireless AP and the second wireless communication device may include a wireless STA. In another example, the first wireless communication device may include a wireless STA and the second wireless communication device may include a wireless AP.

Figure 9:
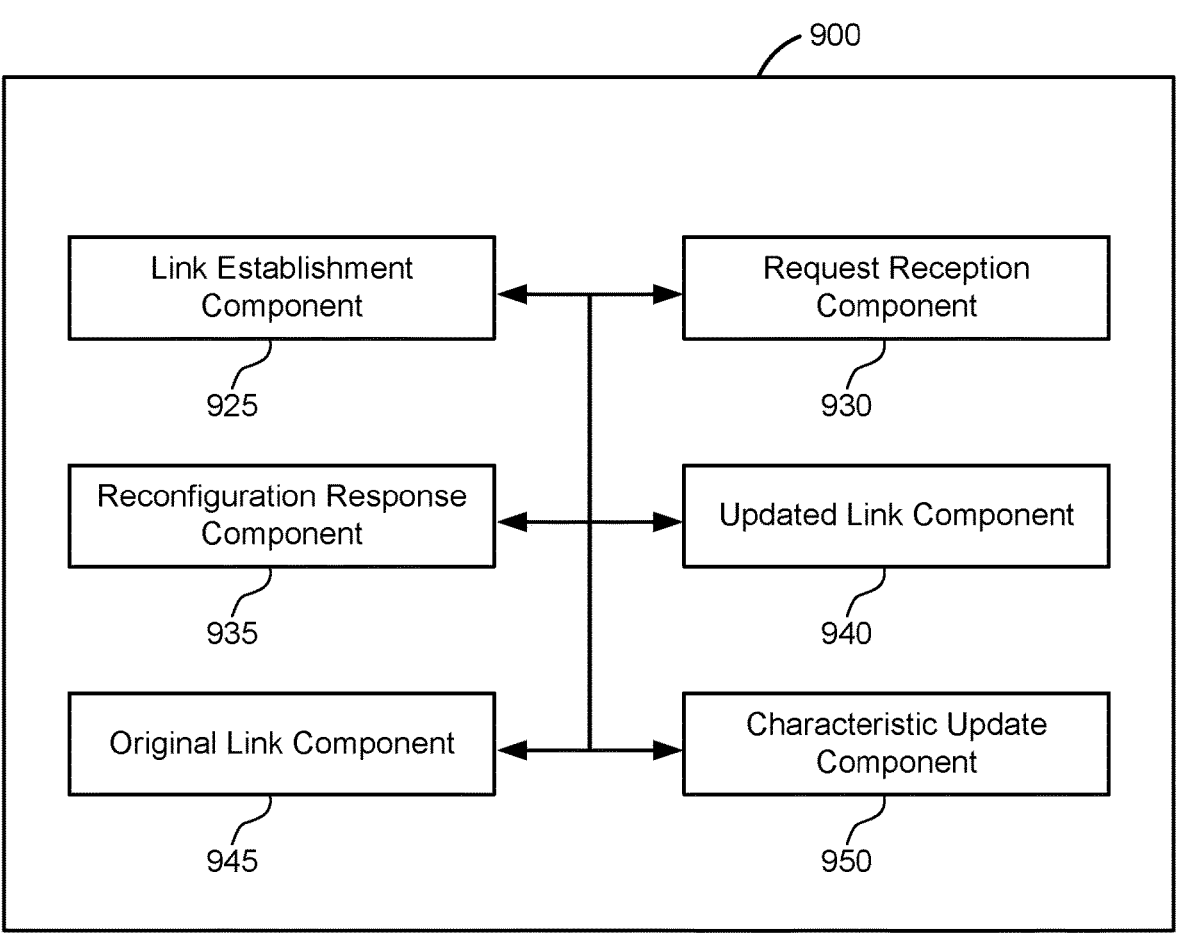

FIG. 9 illustrates a block diagram of an example wireless communication device 900 that supports reconfiguring link characteristics while maintaining links according to some aspects of the present disclosure. In some implementations, the wireless communication device 900 is configured or operable to perform the process 700 described with reference to FIG. 7. In various examples, the wireless communication device 900 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some implementations, the wireless communication device 900 can be a device for use in an MLD, such as a non-AP MLD or an AP MLD as described with reference to FIG. 1. In some other examples, the wireless communication device 900 can be an MLD STA or MLD AP that includes such a chip, SoC, chipset, package or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 900 also includes or can be coupled with an application processor which may be further coupled with another memory. In some implementations, the wireless communication device 900 further includes a UI (such as a touchscreen or keypad) and a display, which may be integrated with the UI to form a touchscreen display. In some implementations, the wireless communication device 900 may further include one or more sensors such as, for example, one or more inertial sensors, accelerometers, temperature sensors, pressure sensors, or altitude sensors.

The wireless communication device 900 includes a link establisher a link establishment component 925, a request reception component 930, a reconfiguration response component 935, an updated link component 940, an original link component 945, a characteristic update component 950. Portions of one or more of the components 925, 930, 935, 940, 945, and 950 may be implemented at least in part in hardware or firmware. For example, the link establishment component 925 may be implemented at least in part by a modem. In some implementations, at least some of the components 925, 930, 935, 940, 945, or 950 are implemented at least in part by a processor and as software stored in a memory. For example, portions of one or more of the components 925, 930, 935, 940, 945, or 950 can be implemented as non-transitory instructions (or "code") executable by the processor to perform the functions or operations of the respective module. In some cases, the wireless communication device 900 may be referred to as a first wireless communication device.

In some implementations, the processor may be a component of a processing system. A processing system may generally refer to a system or series of machines or components that receives inputs and processes the inputs to produce a set of outputs (which may be passed to other systems or components of, for example, the device 900). For example, a processing system of the device 900 may refer to a system including the various other components or subcomponents of the device 900, such as the processor, or a transceiver, or a communications manager, or other components or combinations of components of the device 900. The processing system of the device 900 may interface with other components of the device 900, and may process information received from other components (such as inputs or signals) or output information to other components. For example, a chip or modem of the device 900 may include a processing system, a first interface to output information and a second interface to obtain information. In some implementations, the first interface may refer to an interface between the processing system of the chip or modem and a transmitter, such that the device 900 may transmit information output from the chip or modem. In some implementations, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

The link establishment component 925 is capable of, configured to, or operable to establish, with a second wireless communication device and based on a set of multiple capabilities of the first wireless communication device and the second wireless communication device, a set of wireless communication links each of which is associated with a respective set of multiple parameters. The request reception component 930 is capable of, configured to, or operable to receive, from the second wireless communication device, a request to update a characteristic associated with the second wireless communication device or one or more wireless communication links of the set of wireless communication links while maintaining each wireless communication link of the set of wireless communication links with the second wireless communication device, the characteristic including at least one capability of the set of multiple capabilities or at least one parameter of the respective sets of multiple parameters. The reconfiguration response component 935 is capable of, configured to, or operable to transmit, to the second wireless communication device and based on receiving the request, a response to the request including an indication about updating the characteristic.

In some examples, to support receiving the request, the request reception component 930 is capable of, configured to, or operable to receive, from the second wireless communication device, a message including the request to update the characteristic, and further including an indication that the request to update the characteristic is associated with the set of wireless communication links, where the request may be to update the characteristic while maintaining each wireless communication link of the set of multiple of wireless communication links based on the message including the indication that the request to update the characteristic is associated with the set of wireless communication links.

In some examples, to support receiving the request, the request reception component 930 is capable of, configured to, or operable to receive, from the second wireless communication device, a message including a first field corresponding to the characteristic and indicating the request to update the characteristic, the message not including one or more second fields of which corresponds to a respective one of the set of multiple capabilities or a respective one of the respective sets of multiple parameters that is different than the characteristic requested to be updated.

In some examples, the request is received via a first multi-link element within a first management frame. In some examples, the response is transmitted via a second multi-link element within a second management frame.

In some examples, the first management frame is a multi-link reconfiguration request frame. In some examples, the second management is a multi-link reconfiguration response frame.

In some examples, the response is transmitted within one or more link information fields of the second multi-link element based on the characteristic being associated with the second wireless communication device. In some examples, the response is transmitted within a common information field of the second multi-link element based on the characteristic being associated with the first wireless communication device.

In some examples, to support receiving the request, the request reception component 930 is capable of, configured to, or operable to receive, from the second wireless communication device, a message including a first field corresponding to the characteristic and indicating the request to update the characteristic, the message further including one or more second fields each of which corresponds to a respective one of the set of multiple capabilities or a respective one of the respective sets of multiple parameters that is different than the characteristic requested to be updated.

In some examples, the request includes an indication of an updated characteristic. In some examples, the response includes a confirmation that the characteristic is updated to the updated characteristic.

In some examples, the characteristic includes one of the set of multiple capabilities of the first wireless communication device or the second wireless communication device. In some examples, the response includes the confirmation based on the characteristic including one of the set of multiple capabilities of the first wireless communication device or the second wireless communication device.

In some examples, the request includes an indication of a first proposed update to the characteristic. In some examples, the response includes an indication of a second proposed update to the characteristic that is different than the first proposed update to the characteristic.

In some examples, the original link component 945 is capable of, configured to, or operable to communicate with the second wireless communication device according to the respective sets of multiple parameters without updating the characteristic based on the response indicating a denial of the request to update the characteristic.

In some examples, the characteristic update component 950 is capable of, configured to, or operable to update the characteristic upon transmitting the response based on the response indicating a confirmation of the request to update the characteristic. In some examples, the updated link component 940 may be configured as or otherwise support a means for communicating with the second wireless communication device according to the updated characteristic based on transmitting the response, where communicating with the second wireless communication device according to the updated characteristic begins after transmitting the response.

In some examples, the characteristic update component 950 is capable of, configured to, or operable to update the characteristic to the updated characteristic a defined duration after transmitting the response based on the response indicating a confirmation of the request to update the characteristic. In some examples, the updated link component 940 may be configured as or otherwise support a means for communicating with the second wireless communication device according to the updated characteristic based on transmitting the response, where communicating with the second wireless communication device according to the updated characteristic begins the defined duration after transmitting the response.

In some examples, the characteristic update component 950 is capable of, configured to, or operable to determine the duration between transmitting the response and updating the characteristic, the duration based on the characteristic requested to be updated.

In some examples, the first wireless communication device and the second wireless communication device each include one of a wireless STA and wireless AP. For example, the first wireless communication device may include a wireless AP and the second wireless communication device may include a wireless STA. In another example, the first wireless communication device may include a wireless STA and the second wireless communication device may include a wireless AP.

It should be noted that the methods and processes described herein describe possible implementations, and that the operations and the steps may be rearranged or otherwise modified and that other implementations are possible. Furthermore, aspects from two or more of the methods may be combined.

Implementation examples are described in the following numbered clauses:

Clause 1: A method for wireless communication performable at a first wireless communication device, including: establishing, with a second wireless communication device and based at least in part on a plurality of capabilities of the first wireless communication device and the second wireless communication device, a plurality of wireless communication links each of which is associated with a respective plurality of parameters; transmitting, to the second wireless communication device, a request to update a characteristic associated with the first wireless communication device or one or more wireless communication links of the plurality of wireless communication links while maintaining each wireless communication link of the plurality of wireless communication links with the second wireless communication device, the characteristic including at least one capability of the plurality of capabilities or at least one parameter of the respective plurality of parameters; and receiving, from the second wireless communication device and based at least in part on transmitting the request, a response to the request including an indication about updating the characteristic.

Clause 2: The method of clause 1, where transmitting the request includes: transmitting, to the second wireless communication device, a message including the request to update the characteristic and further including an indication that the request to update the characteristic is associated with the plurality of wireless communication links, where each of the plurality of wireless communication links are maintained while updating the characteristic based at least in part on the message including the indication that the request to update the characteristic is associated with the plurality of wireless communication links.

Clause 3: The method of any of clauses 1 and 2, where transmitting the request includes: transmitting, to the second wireless communication device, a message including a first field corresponding to the characteristic and indicating the request to update the characteristic, the message not including one or more second fields each of which corresponds to a respective one of the plurality of capabilities or a respective one of the respective plurality of parameters that is different than the characteristic requested to be updated.

Clause 4: The method of any of clauses 1 through 3, where the request is transmitted via a first multiple link element within a first management frame; and the response is received via a second multiple link element within a second management frame.

Clause 5: The method of clause 5, where the first management frame is a multi-link reconfiguration request frame; and the second management is a multi-link reconfiguration response frame.

Clause 6: The method of any of clauses 4 and 5, where the request is transmitted within one or more link information fields of the first multiple link element based at least in part on the characteristic being associated with the first wireless communication device; or the request is transmitted within a common information field of the first multiple link element based at least in part on the characteristic being associated with the second wireless communication device.

Clause 7: The method of any of clauses 1, 2, and 4 through 6, where transmitting the request includes: transmitting, to the second wireless communication device, a message including a first field corresponding to the characteristic and indicating the request to update the characteristic, the message further including one or more second fields each of which corresponds to a respective one of the plurality of capabilities or a respective one of the respective plurality of parameters that is different than the characteristic requested to be updated.

Clause 8: The method of any of clauses 1 through 7, where the request includes an indication of an updated characteristic; and the response includes a confirmation that the characteristic is updated to the updated characteristic.

Clause 9: The method of clause 8, where the characteristic includes one of the plurality of capabilities of the first wireless communication device or the second wireless communication device; and the response includes the confirmation based at least in part on the characteristic including one of the plurality of capabilities of the first wireless communication device or the second wireless communication device.

Clause 10: The method of any of clauses 1 through 9, where the request includes an indication of a first proposed update to the characteristic; and the response includes an indication of a second proposed update to the characteristic that is different than the first proposed update to the characteristic.

Clause 11: The method of any of clauses 1 through 10, further including: communicating with the second wireless communication device according to the respective plurality of parameters without updating the characteristic based at least in part on the response indicating a denial of the request to update the characteristic.

Clause 12: The method of any of clauses 1 through 11, further including: updating the characteristic upon receiving the response based at least in part on the response indicating a confirmation of the request to update the characteristic; and communicating with the second wireless communication device according to the updated characteristic based at least in part on receiving the response, where communicating with the second wireless communication device according to the updated characteristic begins after receiving the response.

Clause 13: The method of any of clauses 1 through 12, further including: updating the characteristic a duration after receiving the response based at least in part on the response indicating a confirmation of the request to update the characteristic; and communicating with the second wireless communication device according to the updated characteristic based at least in part on receiving the response, where communicating with the second wireless communication device according to the updated characteristic begins according to the duration after receiving the response.

Clause 14: The method of clause 13, further including: determining the duration between receiving the response and updating the characteristic based at least in part on the characteristic requested to be updated.

Clause 15: The method of any of clauses 1 through 14, where the first wireless communication device and the second wireless communication device each include one of a wireless station and wireless access point.

Clause 16: A method for wireless communication performable at a first wireless communication device, including: establishing, with a second wireless communication device and based at least in part on a plurality of capabilities of the first wireless communication device and the second wireless communication device, a plurality of wireless communication links each of which is associated with a respective plurality of parameters; receiving, from the second wireless communication device, a request to update a characteristic associated with the second wireless communication device or one or more wireless communication links of the plurality of wireless communication links while maintaining each wireless communication link of the plurality of wireless communication links with the second wireless communication device, the characteristic including at least one capability of the plurality of capabilities or at least one parameter of the respective plurality of parameters; and transmitting, to the second wireless communication device and based at least in part on receiving the request, a response to the request including an indication about updating the characteristic.

Clause 17: The method of clause 16, where receiving the request includes: receiving, from the second wireless communication device, a message including the request to update the characteristic, and further including an indication that the request to update the characteristic is associated with the plurality of wireless communication links, where the request is to update the characteristic while maintaining each wireless communication link of the plurality of wireless communication links based at least in part on the message including the indication that the request to update the characteristic is associated with the plurality of wireless communication links.

Clause 18: The method of any of clauses 16 and 17, where receiving the request includes: receiving, from the second wireless communication device, a message including a first field corresponding to the characteristic and indicating the request to update the characteristic, the message not including one or more second fields of which corresponds to a respective one of the plurality of capabilities or a respective one of the respective plurality of parameters that is different than the characteristic requested to be updated.

Clause 19: The method of any of clauses 16 through 18, where the request is received via a first multiple link element within a first management frame; and the response is transmitted via a second multiple link element within a second management frame.

Clause 20: The method of clause 19, where the first management frame is a multi-link reconfiguration request frame; and the second management is a multi-link reconfiguration response frame.

Clause 21: The method of any of clauses 19 and 20, where the response is transmitted within one or more link information fields of the second multiple link element based at least in part on the characteristic being associated with the second wireless communication device; or the response is transmitted within a common information field of the second multiple link element based at least in part on the characteristic being associated with the first wireless communication device.

Clause 22: The method of any of clauses 16, 17, and 19 through 21, where receiving the request includes: receiving, from the second wireless communication device, a message including a first field corresponding to the characteristic and indicating the request to update the characteristic, the message further including one or more second fields each of which corresponds to a respective one of the plurality of capabilities or a respective one of the respective plurality of parameters that is different than the characteristic requested to be updated.

Clause 23: The method of any of clauses 16 through 22, where the request includes an indication of an updated characteristic; and the response includes a confirmation that the characteristic is updated to the updated characteristic.

Clause 24: The method of clause 23, where the characteristic includes one of the plurality of capabilities of the first wireless communication device or the second wireless communication device; and the response includes the confirmation based at least in part on the characteristic including one of the plurality of capabilities of the first wireless communication device or the second wireless communication device.

Clause 25: The method of any of clauses 16 through 24, where the request includes an indication of a first proposed update to the characteristic; and the response includes an indication of a second proposed update to the characteristic that is different than the first proposed update to the characteristic.

Clause 26: The method of any of clauses 16 through 25, further including: communicating with the first wireless communication device according to the respective plurality of parameters without updating the characteristic based at least in part on the response indicating a denial of the request to update the characteristic.

Clause 27: The method of any of clauses 16 through 26, further including: updating the characteristic upon transmitting the response based at least in part on the response indicating a confirmation of the request to update the characteristic; and communicating with the second wireless communication device according to the updated characteristic based at least in part on transmitting the response, where communicating with the second wireless communication device according to the updated characteristic begins after transmitting the response.

Clause 28: The method of any of clauses 16 through 27, further including: updating the characteristic a duration after transmitting the response based at least in part on the response indicating a confirmation of the request to update the characteristic; and communicating with the second wireless communication device according to the updated characteristic based at least in part on transmitting the response, where communicating with the second wireless communication device according to the updated characteristic begins the duration after transmitting the response.

Clause 29: The method of clause 28, further including: determining the duration between transmitting the response and updating the characteristic based at least in part on the characteristic requested to be updated.

Clause 30: The method of any of clauses 16 through 29, where the first wireless communication device and the second wireless communication device each include one of a wireless station and wireless access point.

Clause 31: An apparatus for wireless communication performable at a first wireless communication device, including a processor; memory coupled with the processor; and instructions stored in the memory and executable by the processor to cause the apparatus to perform a method of any of clauses 1 through 15.

Clause 32: An apparatus for wireless communication performable at a first wireless communication device, including at least one means for performing a method of any of clauses 1 through 15.

Clause 33: A non-transitory computer-readable medium storing code for wireless communication performable at a first wireless communication device, the code including instructions executable by a processor to perform a method of any of clauses 1 through 15.

Clause 34: An apparatus for wireless communication performable at a first wireless communication device, including a processor; memory coupled with the processor; and instructions stored in the memory and executable by the processor to cause the apparatus to perform a method of any of clauses 16 through 30.

Clause 35: An apparatus for wireless communication performable at a first wireless communication device, including at least one means for performing a method of any of clauses 16 through 308.

Clause 36: A non-transitory computer-readable medium storing code for wireless communication performable at a first wireless communication device, the code including instructions executable by a processor to perform a method of any of clauses 16 through 30.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for wireless communication performable at a first wireless communication device, comprising:

establishing, with a second wireless communication device and based at least in part on a plurality of capabilities of the first wireless communication device, a plurality of wireless communication links each of which is associated with a respective plurality of parameters;

transmitting, to the second wireless communication device, a request to update a characteristic associated with the first wireless communication device or one or more wireless communication links of the plurality of wireless communication links while maintaining each wireless communication link of the plurality of wireless communication links with the second wireless communication device, wherein the characteristic comprises at least one capability of the plurality of capabilities or at least one parameter of the respective pluralities of parameters, and wherein the request comprises a subset of fields of a plurality of fields corresponding to the plurality of capabilities and the respective pluralities of parameters, the subset of fields indicating the at least one capability of the plurality of capabilities or the at least one parameter of the respective pluralities of parameters; and receiving, from the second wireless communication device and based at least in part on transmitting the request, a response to the request comprising an indication about updating the characteristic.

2. The method of claim 1, wherein transmitting the request comprises:

transmitting, to the second wireless communication device, a message comprising the request to update the characteristic and further comprising an indication that the request to update the characteristic is associated with the plurality of wireless communication links, wherein the request is to update the characteristic while maintaining each wireless communication link of the plurality of wireless communication links based at least in part on the message comprising the indication that the request to update the characteristic is associated with the plurality of wireless communication links.

3. The method of claim 1, wherein transmitting the request comprises:

transmitting, to the second wireless communication device, a message comprising a first field corresponding to the characteristic and indicating the request to update the characteristic, the message not comprising one or more second fields each of which corresponds to a respective one of the plurality of capabilities or a respective one of the respective plurality of parameters that is different than the characteristic requested to be updated.

4. The method of claim 1, wherein:

the request is transmitted via a first multi-link element within a first management frame; and the response is received via a second multi-link element within a second management frame.

5. The method of claim 4, wherein:

the first management frame is a multi-link reconfiguration request frame; and the second management frame is a multi-link reconfiguration response frame.

6. The method of claim 4, wherein:

the request is transmitted within one or more link information fields of the first multi-link element based at least in part on the characteristic being associated with the first wireless communication device; or the request is transmitted within a common information field of the first multi-link element based at least in part on the characteristic being associated with the second wireless communication device.

7. The method of claim 1, wherein transmitting the request comprises:

transmitting, to the second wireless communication device, a message comprising a first field corresponding to the characteristic and indicating the request to update the characteristic, the message further comprising one or more second fields each of which corresponds to a respective one of the plurality of capabilities or a respective one of the respective plurality of parameters that is different than the characteristic requested to be updated.

8. The method of claim 1, wherein:

the request comprises an indication of an updated characteristic; and the response comprises a confirmation that the characteristic is updated to the updated characteristic.

9. The method of claim 8, wherein:

the characteristic comprises one of the plurality of capabilities of the first wireless communication device or the second wireless communication device; and the response comprises the confirmation based at least in part on the characteristic comprising one of the plurality of capabilities of the first wireless communication device or the second wireless communication device.

10. The method of claim 1, wherein:

the request comprises an indication of a first proposed update to the characteristic; and the response comprises an indication of a second proposed update to the characteristic that is different than the first proposed update to the characteristic.

11. The method of claim 1, further comprising:

communicating with the second wireless communication device according to the respective plurality of parameters without updating the characteristic based at least in part on the response indicating a denial of the request to update the characteristic.

12. The method of claim 1, further comprising:

updating the characteristic upon receiving the response based at least in part on the response indicating a confirmation of the request to update the characteristic; and communicating with the second wireless communication device according to the updated characteristic based at least in part on receiving the response, wherein communicating with the second wireless communication device according to the updated characteristic begins after receiving the response.

13. The method of claim 1, further comprising:

updating the characteristic a duration after receiving the response based at least in part on the response indicating a confirmation of the request to update the characteristic; and communicating with the second wireless communication device according to the updated characteristic based at least in part on receiving the response, wherein communicating with the second wireless communication device according to the updated characteristic begins according to the duration after receiving the response.

14. The method of claim 13, further comprising:

determining the duration between receiving the response and updating the characteristic based at least in part on the characteristic requested to be updated.

15. A method for wireless communication performable at a first wireless communication device, comprising:

establishing, with a second wireless communication device and based at least in part on a plurality of capabilities of the first wireless communication device and the second wireless communication device, a plurality of wireless communication links each of which is associated with a respective plurality of parameters;

receiving, from the second wireless communication device, a request to update a characteristic associated with the second wireless communication device or one or more wireless communication links of the plurality of wireless communication links while maintaining each wireless communication link of the plurality of wireless communication links with the second wireless communication device, wherein the characteristic comprises at least one capability of the plurality of capabilities or at least one parameter of the respective pluralities of parameters, and wherein the request comprises a subset of fields of a plurality of fields corresponding to the plurality of capabilities and the respective pluralities of parameters, the subset of fields indicating the at least one capability of the plurality of capabilities or the at least one parameter of the respective pluralities of parameters; and transmitting, to the second wireless communication device and based at least in part on receiving the request, a response to the request comprising an indication about updating the characteristic.

16. The method of claim 15, wherein receiving the request comprises:

receiving, from the second wireless communication device, a message comprising the request to update the characteristic, and further comprising an indication that the request to update the characteristic is associated with the plurality of wireless communication links, wherein the request is to update the characteristic while maintaining each wireless communication link of the plurality of wireless communication links based at least in part on the message comprising the indication that the request to update the characteristic is associated with the plurality of wireless communication links.

17. The method of claim 15, wherein receiving the request comprises:

receiving, from the second wireless communication device, a message comprising a first field corresponding to the characteristic and indicating the request to update the characteristic, the message not comprising one or more second fields of which corresponds to a respective one of the plurality of capabilities or a respective one of the respective plurality of parameters that is different than the characteristic requested to be updated.

18. The method of claim 15, wherein:

the request is received via a first multi-link element within a first management frame; and the response is transmitted via a second multi-link element within a second management frame.

19. The method of claim 18, wherein:

the first management frame is a multi-link reconfiguration request frame; and the second management frame is a multi-link reconfiguration response frame.

20. The method of claim 18, wherein:

the response is transmitted within one or more link information fields of the second multi-link element based at least in part on the characteristic being associated with the second wireless communication device; or the response is transmitted within a common information field of the second multi-link element based at least in part on the characteristic being associated with the first wireless communication device.

21. The method of claim 15, wherein receiving the request comprises:

receiving, from the second wireless communication device, a message comprising a first field corresponding to the characteristic and indicating the request to update the characteristic, the message further comprising one or more second fields each of which corresponds to a respective one of the plurality of capabilities or a respective one of the respective plurality of parameters that is different than the characteristic requested to be updated.

22. The method of claim 15, wherein:

the request comprises an indication of an updated characteristic; and the response comprises a confirmation that the characteristic is updated to the updated characteristic.

23. The method of claim 22, wherein:

the characteristic comprises one of the plurality of capabilities of the first wireless communication device or the second wireless communication device; and the response comprises the confirmation based at least in part on the characteristic comprising one of the plurality of capabilities of the first wireless communication device or the second wireless communication device.

24. The method of claim 15, wherein:

the request comprises an indication of a first proposed update to the characteristic; and the response comprises an indication of a second proposed update to the characteristic that is different than the first proposed update to the characteristic.

25. The method of claim 15, further comprising:

communicating with the second wireless communication device according to the respective plurality of parameters without updating the characteristic based at least in part on the response indicating a denial of the request to update the characteristic.

26. The method of claim 15, further comprising:

updating the characteristic upon transmitting the response based at least in part on the response indicating a confirmation of the request to update the characteristic; and communicating with the second wireless communication device according to the updated characteristic based at least in part on transmitting the response, wherein communicating with the second wireless communication device according to the updated characteristic begins after transmitting the response.

27. The method of claim 15, further comprising:

updating the characteristic a duration after transmitting the response based at least in part on the response indicating a confirmation of the request to update the characteristic; and communicating with the second wireless communication device according to the updated characteristic based at least in part on transmitting the response, wherein communicating with the second wireless communication device according to the updated characteristic begins the duration after transmitting the response.

28. An apparatus for wireless communication performable at a first wireless communication device, comprising:

a processor; and memory coupled with the processor and storing instructions executable by the processor to cause the apparatus to:

establish, with a second wireless communication device and based at least in part on a plurality of capabilities of the first wireless communication device and the second wireless communication device, a plurality of wireless communication links each of which is associated with a respective plurality of parameters;

transmit, to the second wireless communication device, a request to update a characteristic associated with the first wireless communication device or one or more wireless communication links of the plurality of wireless communication links while maintaining each wireless communication link of the plurality of wireless communication links with the second wireless communication device, wherein the characteristic comprises at least one capability of the plurality of capabilities or at least one parameter of the respective pluralities of parameters, and wherein the request comprises a subset of fields of a plurality of fields corresponding to the plurality of capabilities and the respective pluralities of parameters, the subset of fields indicating the at least one capability of the plurality of capabilities or the at least one parameter of the respective pluralities of parameters; and receive, from the second wireless communication device and based at least in part on transmitting the request, a response to the request comprising an indication about updating the characteristic.

29. The apparatus of claim 28, wherein the instructions to transmit the request are executable by the processor to cause the apparatus to:

transmit, to the second wireless communication device, a message comprising the request to update the characteristic and further comprising an indication that the request to update the characteristic is associated with the plurality of wireless communication links, wherein each of the plurality of wireless communication links are maintained while updating the characteristic based at least in part on the message comprising the indication that the request to update the characteristic is associated with the plurality of wireless communication links.

30. An apparatus for wireless communication performable at a first wireless communication device, comprising:

a processor; and memory coupled with the processor and storing instructions executable by the processor to cause the apparatus to:

establish, with a second wireless communication device and based at least in part on a plurality of capabilities of the first wireless communication device and the second wireless communication device, a plurality of wireless communication links each of which is associated with a respective plurality of parameters;

receive, from the second wireless communication device, a request to update a characteristic associated with the second wireless communication device or one or more wireless communication links of the plurality of wireless communication links while maintaining each wireless communication link of the plurality of wireless communication links with the second wireless communication device, wherein the characteristic comprises at least one capability of the plurality of capabilities or at least one parameter of the respective pluralities of parameters, and wherein the request comprises a subset of fields of a plurality of fields corresponding to the plurality of capabilities and the respective pluralities of parameters, the subset of fields indicating the at least one capability of the plurality of capabilities or the at least one parameter of the respective pluralities of parameters; and transmit, to the second wireless communication device and based at least in part on receiving the request, a response to the request comprising an indication about updating the characteristic.

* * * * *